(12) United States Patent
Cooper et al.

(10) Patent No.: US 8,191,098 B2
(45) Date of Patent: May 29, 2012

(54) MULTI-SOURCE BRIDGE CONTENT DISTRIBUTION SYSTEM AND METHOD

(75) Inventors: Robin Ross Cooper, La Mesa, CA (US); Thomas A. Munro, San Diego, CA (US)

(73) Assignee: Verimatrix, Inc., San Diego, CA (US)

( * ) Notice: Subject to any disclaimer, the term of this patent is extended or adjusted under 35 U.S.C. 154(b) by 700 days.

(21) Appl. No.: 11/614,888

(22) Filed: Dec. 21, 2006

(65) Prior Publication Data

US 2008/0155614 A1    Jun. 26, 2008

Related U.S. Application Data

(60) Provisional application No. 60/753,697, filed on Dec. 22, 2005, provisional application No. 60/802,953, filed on May 24, 2006.

(51) Int. Cl.
*H04N 7/173* (2006.01)

(52) U.S. Cl. .................. 725/105; 725/119; 725/115

(58) Field of Classification Search .................. 725/119, 725/105, 86–99, 145, 115
See application file for complete search history.

(56) References Cited

U.S. PATENT DOCUMENTS

| | | | | |
|---|---|---|---|---|
| 5,600,364 A | * | 2/1997 | Hendricks et al. | ................. 725/9 |
| 5,600,573 A | * | 2/1997 | Hendricks et al. | ............ 725/109 |
| 5,621,728 A | | 4/1997 | Lightfoot et al. | |
| 5,636,346 A | * | 6/1997 | Saxe | ............................. 725/35 |
| 5,790,176 A | | 8/1998 | Craig | |
| 5,813,004 A | | 9/1998 | Meck et al. | |
| 5,889,868 A | | 3/1999 | Moskowitz et al. | |
| 5,892,900 A | * | 4/1999 | Ginter et al. | ..................... 726/26 |
| 5,956,716 A | * | 9/1999 | Kenner et al. | .......................... 1/1 |
| 6,385,596 B1 | | 5/2002 | Wiser et al. | |
| 6,470,378 B1 | * | 10/2002 | Tracton et al. | ................ 709/203 |
| 6,574,609 B1 | | 6/2003 | Dawns et al. | |
| 6,735,699 B1 | | 5/2004 | Sasaki et al. | |
| 6,804,779 B1 | | 10/2004 | Carroni et al. | |
| 6,850,900 B1 | | 2/2005 | Hare et al. | |

(Continued)

FOREIGN PATENT DOCUMENTS

WO    02093298    11/2002

(Continued)

OTHER PUBLICATIONS

U.S. Appl. No. 11/680,443, Feb. 28, 2007, Cooper et al.

(Continued)

*Primary Examiner* — Brian Pendleton
*Assistant Examiner* — Fernando Alcon
(74) *Attorney, Agent, or Firm* — Procopio, Cory, Hargreaves & Savitch LLP

(57) ABSTRACT

A multi-source bridge content distribution system links multiple content owners with access network operators or content distribution providers leasing space on access networks so that multi-media content can be provided from multiple content owners to consumers through a multi-source bridge or data center. Content files and associated content owner preference settings are provided from a plurality of content sources or providers to the multi-source data center. Files stored at the data center or locally at an access network are provided to subscribers through the local access network Content files are provided if the content owner preference settings are a sufficient match with service provider access network preference settings set up by the service provider using the access network to provide content to subscribers.

51 Claims, 23 Drawing Sheets

U.S. PATENT DOCUMENTS

| | | | |
|---|---|---|---|
| 6,976,010 B2* | 12/2005 | Banerjee et al. | 705/51 |
| 6,996,129 B2 | 2/2006 | Krause et al. | |
| 7,111,171 B2 | 9/2006 | Collens et al. | |
| 7,620,180 B2* | 11/2009 | Pedlow et al. | 380/211 |
| 2001/0010046 A1 | 7/2001 | Muyres | |
| 2001/0049824 A1* | 12/2001 | Baker et al. | 725/109 |
| 2001/0050920 A1* | 12/2001 | Hassell et al. | 370/465 |
| 2001/0051996 A1 | 12/2001 | Cooper et al. | |
| 2002/0013950 A1* | 1/2002 | Tomsen | 725/109 |
| 2002/0026645 A1* | 2/2002 | Son et al. | 725/117 |
| 2002/0049977 A1* | 4/2002 | Miller et al. | 725/82 |
| 2002/0051539 A1* | 5/2002 | Okimoto et al. | 725/31 |
| 2002/0059621 A1* | 5/2002 | Thomas et al. | 725/87 |
| 2002/0069416 A1 | 6/2002 | Stiles | |
| 2002/0112035 A1 | 8/2002 | Carey et al. | |
| 2002/0124251 A1* | 9/2002 | Hunter et al. | 725/32 |
| 2002/0124253 A1* | 9/2002 | Eyer et al. | 725/34 |
| 2002/0129367 A1* | 9/2002 | Devara | 725/46 |
| 2002/0143791 A1 | 10/2002 | Levanon et al. | |
| 2002/0143976 A1* | 10/2002 | Barker et al. | 725/144 |
| 2002/0157101 A1 | 10/2002 | Schrader et al. | |
| 2002/0169700 A1 | 11/2002 | Huffman et al. | |
| 2003/0009423 A1* | 1/2003 | Wang et al. | 705/51 |
| 2003/0014483 A1 | 1/2003 | Stevenson et al. | |
| 2003/0018745 A1* | 1/2003 | McGowan et al. | 725/125 |
| 2003/0028889 A1* | 2/2003 | McCoskey et al. | 725/91 |
| 2003/0043815 A1* | 3/2003 | Tinsley et al. | 370/395.21 |
| 2003/0046686 A1* | 3/2003 | Candelore et al. | 725/31 |
| 2003/0093665 A1 | 5/2003 | Cooper et al. | |
| 2003/0149581 A1 | 8/2003 | Chaudhri et al. | |
| 2003/0198461 A1* | 10/2003 | Taylor et al. | 725/58 |
| 2003/0204602 A1 | 10/2003 | Hudson et al. | |
| 2003/0236843 A1* | 12/2003 | Weber et al. | 709/206 |
| 2004/0015565 A1 | 1/2004 | Bednar et al. | |
| 2004/0078807 A1 | 4/2004 | Fries et al. | |
| 2004/0154043 A1* | 8/2004 | Roman | 725/119 |
| 2004/0220926 A1 | 11/2004 | Lamkin et al. | |
| 2004/0254851 A1 | 12/2004 | Himeno | |
| 2005/0005025 A1 | 1/2005 | Harville et al. | |
| 2005/0165686 A1 | 7/2005 | Zack et al. | |
| 2005/0262034 A1* | 11/2005 | Carro | 707/1 |
| 2006/0020525 A1 | 1/2006 | Borelli et al. | |
| 2006/0064715 A1* | 3/2006 | Poslinski | 725/28 |
| 2006/0074754 A1 | 4/2006 | Toyohara et al. | |
| 2006/0098643 A1 | 5/2006 | Pfeffer et al. | |
| 2006/0150214 A1 | 7/2006 | Ramraz et al. | |
| 2006/0156352 A1* | 7/2006 | Smith et al. | 725/86 |
| 2006/0161635 A1 | 7/2006 | Lamkin et al. | |
| 2006/0230062 A1 | 10/2006 | Roy-Chowdhury et al. | |

FOREIGN PATENT DOCUMENTS

| | | |
|---|---|---|
| WO | 2005070172 | 8/2005 |
| WO | WO 2006073543 | 7/2006 |

OTHER PUBLICATIONS

International Search Report and Written Opinion of the International Searching Authority for related PCT/US06/62553, dated Aug. 18, 2008.

European Search Report dated Nov. 12, 2010 from European Patent Application No. 06846785.

* cited by examiner

FIG. 1: PRIOR ART

Name of Title: _____

Name of Actor: _____

Genre: _____

Year: _____

Studio: _____

Other: _____

[Cancel] [Search]

| Geography | Ratings | Parental Controls | Pricing | Policies, Procedures, Liabilities, Disclaimers | DRM Requirements | Copy Control | Localization Requirements | Titles |
|---|---|---|---|---|---|---|---|---|
| 8. Content Owner's Preference Engine | | | | | | | | |

| Geography | Ratings | Parental Controls | Pricing | Policies, Procedures, Liabilities, Disclaimers | DRM Requirements | Copy Control | Localization Requirements | Titles |
|---|---|---|---|---|---|---|---|---|
| 9. Access Network's Preference Engine | | | | | | | | |

| Others... | Ratings | Parental Controls | Pricing | | | | | Titles |
|---|---|---|---|---|---|---|---|---|
| 13. Subscriber Preference Engine | | | | | | | | |

| Geography | Ratings | Parental Controls | Pricing | Policies, Procedures, Liabilities, Disclaimers | DRM Requirements | Copy Control | Localization Requirements | | Titles |
|---|---|---|---|---|---|---|---|---|---|
| 8. Content Owner's Preference Engine ||||||||||
| Geography | Ratings Qualifications | Parental Controls | Pricing | Policies, Procedures, Liabilities, Disclaimers | DRM Requirements | Copy Control | Localization Requirements | | Titles |
| 14. Governmental Owner's Preference Engine ||||||||||
| Geography | Ratings | Parental Controls | Pricing | Policies, Procedures, Liabilities, Disclaimers | DRM Requirements | Copy Control | Localization Requirements | | Titles |
| 9. Access Network's Preference Engine ||||||||||
| Others... | Ratings | Parental Controls | Pricing | | | | | | Titles |
| 13. Subscriber Preference Engine ||||||||||

FIG. 15

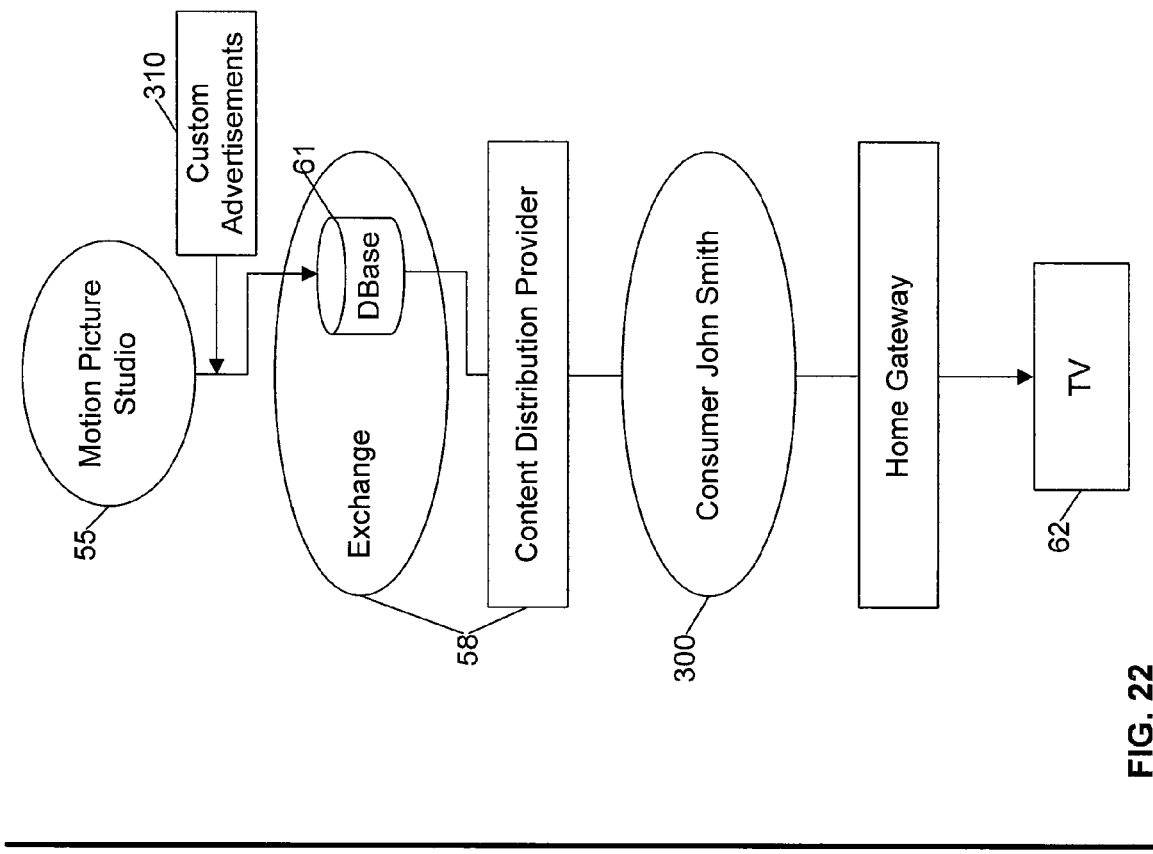
FIG. 22
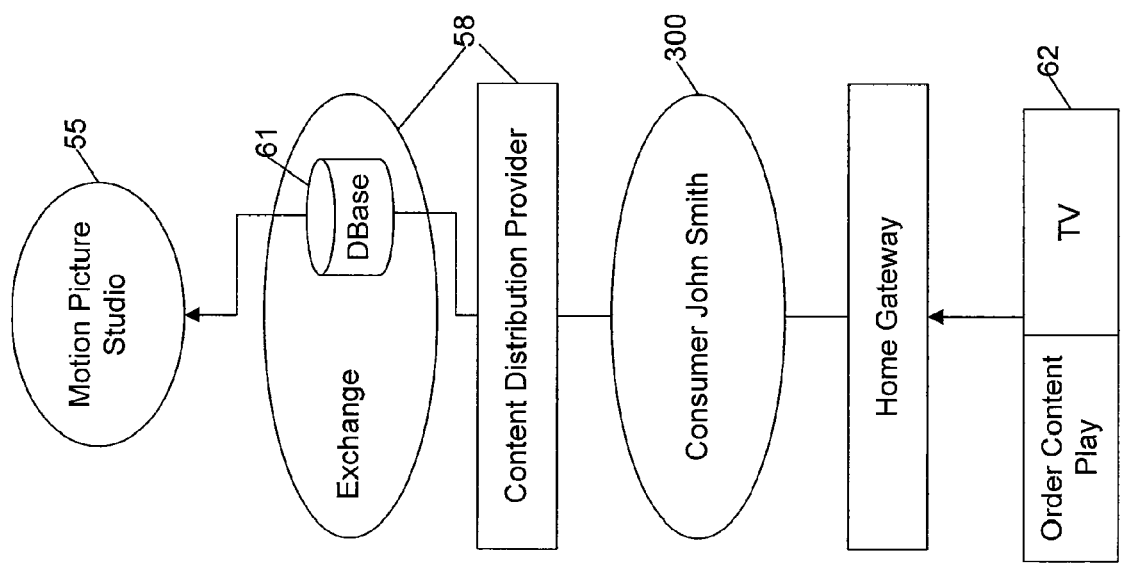

MULTI-SOURCE BRIDGE CONTENT DISTRIBUTION SYSTEM AND METHOD

RELATED APPLICATION

The present application claims the benefit of U.S. provisional patent application No. 60/753,697 filed Dec. 22, 2005, and U.S. provisional patent application No. 60/802,953 filed May 24, 2006, both of which are incorporated herein by reference in their entirety.

BACKGROUND

1. Field of the Invention

The present invention relates to delivery of multi-media content into consumer's homes, and is particularly concerned with a network architecture or multi-source bridge network distribution system and method for integrating content from different sources and allowing the content to be offered by content distribution providers to end users over access networks.

2. Related Art

There are huge battles being waged over the delivery of multi-media content into consumer's homes. In addition to the incumbent cable and satellite offerings, there are now offerings from telephone companies as they attempt to reinvent their businesses. In the near future, there will be offerings from the large web portals such as Yahoo! and Google. These web portals are currently searching for ways to bring content to consumers. However, they have virtually no ownership to the access networks. An access network is a network that connects subscribers to telecommunication service providers over public ground. For example, an access network may provide a route between the subscriber's home and an Internet Service Provider (ISP) itself. Access networks are used by the various consumers around the world.

The problem with all of these competing services is that it tends to fracture the content offerings. For example, a consumer would need to go to a satellite service to get all of the football games on a given Sunday. At the same time, the same consumer would need to go to the telephone company's (Telco's) service in order to get the latest in video-on-demand (VOD) content. Similarly, the same consumer may need to go to the web to get the widest selection of documentaries. Finally, this consumer may need to use the local cable service (with its specific content offerings) as the access network. As you can see, the consumer is not well served in this scenario as all of the competing platforms are using (and withholding) content in order to promote their own branded services.

There are many important factors to consider when looking to ultimately satisfy the needs of the consumer for access to multi-media content from various providers. Some of these factors are:

1. The most convenient and easy-to-use offering.
2. The best possible pricing model.
3. The widest selection of readily available content or "titles".
4. Powerful search capabilities in order to find these titles.
5. Time-shifting devices that allow for the capture of content to be played at a more convenient time
6. Place-shifting technologies that allow a consumer to enjoy content in other geographical areas.

In addition to these items listed above, it is also very important that the present-day competitive environment stay intact, as a monopoly (or virtual monopoly) in the area of Pay-TV could cause significant problems to everyone concerned. For the consumer, such a monopoly would limit the number of innovative solutions that are made available to the market and pricing models for various services may be kept prohibitively high. For content owners, a monopoly could damage their ability to appropriately monetize their valuable content. Such a monopoly could also damage the distribution chain as there may be extreme pressure being exerted from both sides of the equation.

The problem in the market is well recognized by most consumers of television product. Even with more than 100 broadcast channels and hundreds of VOD titles, there never seems to be anything interesting to watch on television [TV]. Given the enormous library of audio/video content that's available today, the consumer tends to be the unlikely victim of the wars between the various service providers. The consumer can be frustrated because an enormous amount of content is withheld due to a myriad of business and political reasons. Although it is understood that certain titles will be withheld in order to maximize the monetary potential within a dedicated channel of distribution, there is no reason why the majority of all content be withheld. Rather, it may be a better strategy to offer these huge libraries of content in such a way as all participants within the distribution chain profit from the experience.

When you look at the competitive landscape today, one threat stands out. The large web portals could relegate the access network operators to being the broadband pipe only. This would mean a consumer uses his or her local access network to log-on to the Internet, and then all future content plays become transactions between the consumer and the web portal directly. There would be no cooperation or revenue sharing between the web portal and the access network operator. Therefore, there is little or no motivation for the partners within the established content distribution chains to participate with the web portals.

Certain government agencies such as the Federal Communications Commission (FCC) in the US are constantly looking for ways to make the competitive landscape fair and to bring the best possible service offerings and value offerings to consumers. Although these agencies ultimately look to protect the consumer, their efforts continue to fracture the various content offerings as well.

Although content owners world-wide ultimately want to make the greatest return on their investment, they have an equal interest in keeping the landscape competitive. If a huge company steps in and purchases the bulk of their content today, this same company may drive down prices in the future (after eliminating all competition). Although it is understandable that content owners would take steps to protect themselves from a potential monopolistic environment, this further adds to the problem of fractured content offerings to consumers as described above.

Therefore, what is needed is a system and method that overcomes these significant problems found in the conventional systems as described above.

SUMMARY

Embodiments described herein provide for a managed network that integrates content from multiple sources and links to head-end and billing systems operated by access network operators.

A method of distributing content from a plurality of different content sources to consumer or subscriber devices in one embodiment comprises receiving and storing content files from a plurality of different content sources at a multi-source data center, connecting the multi-source data center to a plurality of multi-source content distribution providers over a multi-source network, each multi-source content distribution provider being linked to a respective group of subscribers via a network such as a local access network, and providing the content of selected content files from the multi-source data center to subscriber devices through the content distribution provider and network associated with each subscriber device.

In one embodiment, a multi-source bridge network system is provided which integrates and links content offerings from multiple sources to consumers via local access networks such as cable, satellite, and Telco-TV operations. This system can allow service providers who own and operate access networks or distribution providers who rent or purchase capacity on access networks, such as Internet service providers (ISP), platforms, or other types of provider of video or audio services, to provide huge libraries of content while being compensated for their efforts. The service or multi-source distribution providers may advertise these various content offerings to their local communities, further compensating the distribution chain.

The multi-source content distribution system provides a multi-source network for distributing content from multiple sources with a three-tier approach—Content owner to access network to consumer. The access networks may act as peer-to-peer nodes on such a network so content can move laterally from one access network to another, as well as from the multi-source data center to an access network.

A multi-source content distribution network system in one embodiment comprises a plurality of multi-source content distribution providers each associated with a different group of subscribers, each content distribution provider having a network, such as a local access network, for distributing content to the respective subscriber group, a multi-source data center having a first communication module configured to communicate with a plurality of content providers, a data storage module associated with the first communication module for receiving and storing content files from the content sources, a second communication module configured to provide requested content files to the content distribution providers, and a control module configured to control operation of the communication modules to receive and distribute content files and processing of content files for storage in the data storage module, and a multi-source network linking the multi-source data center to the multi-source distribution providers, whereby content from a plurality of different content providers can be provided from the multi-source data center to any subscriber through the associated multi-source content distribution provider and network.

In one embodiment, the control module includes a search engine which allows content distribution service providers or access network providers to search for content files in the multi-source data base in response to consumer or subscriber requests from clients for specific content, if the content is not available in an access network data base. The system may include preference modules or engines which contain content provider preference settings and access network/content distribution provider preference settings. Content files are downloaded if content owner or provider preference settings are a sufficient match with service provider access network preference settings set up by the service provider using the access network to provide content to subscribers.

Up to four levels of preference settings may be provided in the system, specifically content owner, government or other organization, access network, and subscriber preference settings. The multi-source data center may also link the billing systems of the content owner and the content distribution provider so that revenues can be appropriately shared.

For security purposes, consumer-level information may made available to the multi-source data center by way of a proxy, in which the consumer name is first converted to an identification code or number, and the ID Number is sent to the data center.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 9 illustrates an example of a search request form which may be provided to a consumer or subscriber in the system of FIGS. 2 to 8

FIG. 13 illustrates an example of preference settings for the content owner, access network, and subscriber in the embodiment of FIG. 12;

FIG. 15 illustrates the hierarchy of preference engines in the system of FIG. 14;

FIG. 22 is a flow diagram illustrating method steps for content ordering by a user and subsequent insertion of relevant advertisements within the distribution chain using the proxy profile module of FIGS. 17 and 21.

DETAILED DESCRIPTION

Certain embodiments as disclosed herein provide for integrating content from virtually any source and offering the content to consumers via access network providers or other distribution services using rented or purchased capacity on an access network. For example, one embodiment as disclosed herein allows for a multi-source network distribution system which coordinates preference settings of content providers and access networks to ensure that content from different sources can be provided to end user or distribution service providers under mutually acceptable terms.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1:
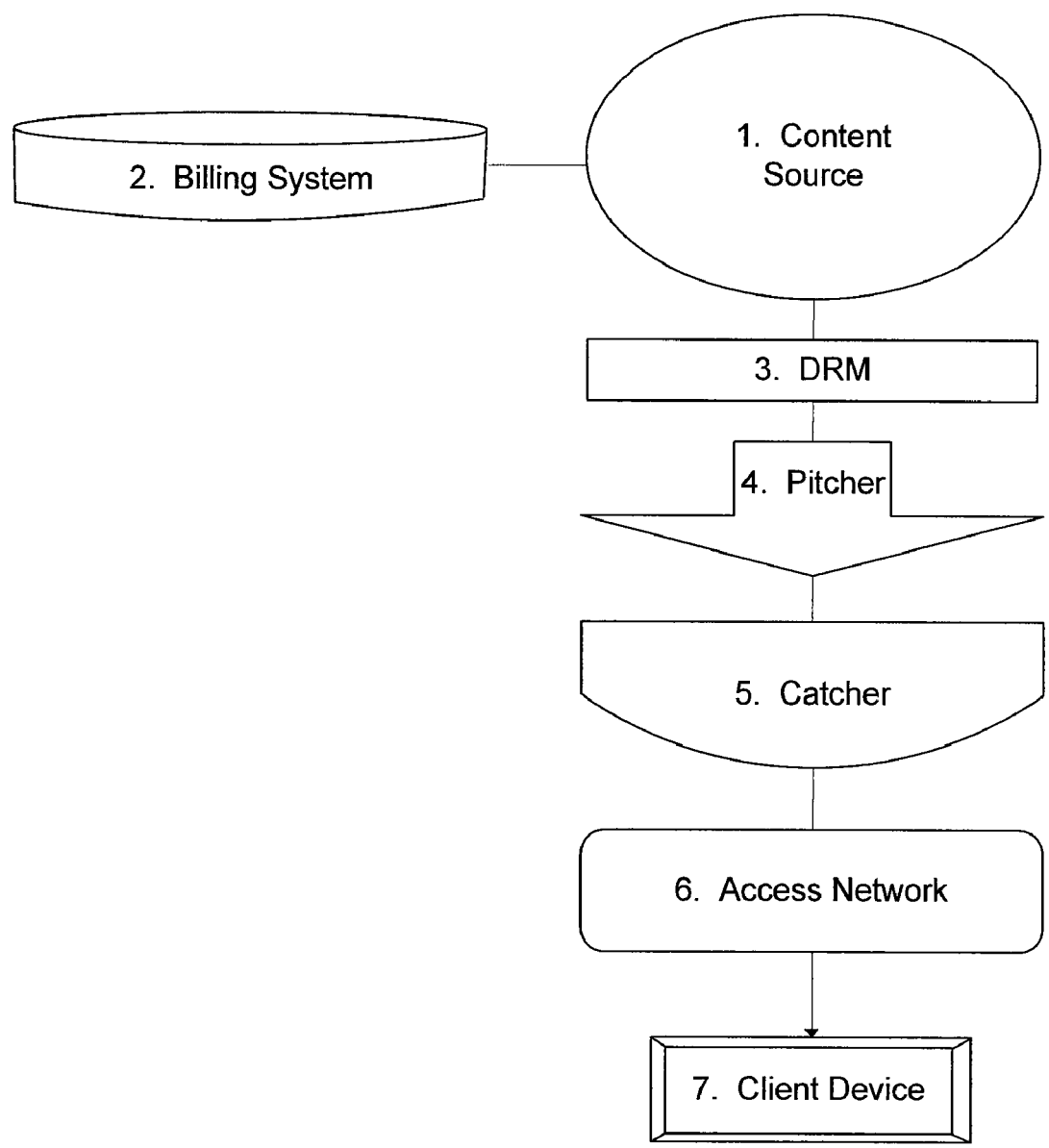
FIG. 1 is a simple block diagram illustrating a prior art network distribution system for providing content from a provider to a consumer through an access network.

FIG. 1 illustrates a prior art content distribution system. A content source 1 has an associated billing system 2 that verifies that a payment is received before content is sent through the distribution channel. Once the billing system 2 is satisfied that it has received payment-in-full, or that there is adequate confidence of receipt of payment within an acceptable time frame, the content is prepared with the appropriate digital rights management (DRM) properties 3.

DRM is typically referred to as a collection of properties associated with the discrete content unit that serves to protect the content from un-licensed and un-anticipated use. In most cases, DRM refers to encryption, key-passing methods, "rights" associated with both time and location, and the marking of content in certain ways in order to either damage its play-back quality during un-authorized use, set usage flags, or assist with other forensic purposes. In some cases, content providers may decide to add no DRM whatsoever, in which case step 3 in the distribution channel of FIG. 1 is eliminated.

The billing system 2 can take virtually all forms of payment, such as checks, credit cards, debit cards, PAYPAL® and equivalents, wire transfers, contracts containing payment conditions over time, and other forms of payment.

After the DRM properties have been added to the content in step 3, the content provider has the responsibility to transmit the content from content source 1 to the access network 6. In most cases, this means the content provider uses a pitcher mechanism 4 to send the content, although there are numerous other methods through which content can be sent to an access network. In a typical scenario, the pitcher 4 is using a large broadband (or large spectrum) connection to send the content to its intended location. These pitcher mechanisms 4 may use satellite or fiber-optic networks to transmit the content. On the other end, a catcher mechanism 5 is used by the access network to receive the content. Catcher mechanism 5 is most likely a reverse mirror-image of the pitcher mechanism 4. For example, if the pitcher 4 is a satellite transponder, the catcher 5 is a satellite receiver. If the pitcher 4 is an FTP application running over a high-speed land-line connection, the catcher 5 uses an FTP application over its own high-speed land-line connection.

Ultimately, the access network 6 receives the content and allows a customer or subscriber's client device 7 to view the content (as is appropriate under the rules and conditions of the DRM—if any). In this prior art content distribution system, there is no need for the content provider to remunerate the access network for a given transaction, and thus there is also no benefit for the access network to promote the content offering(s).

Figure 2:
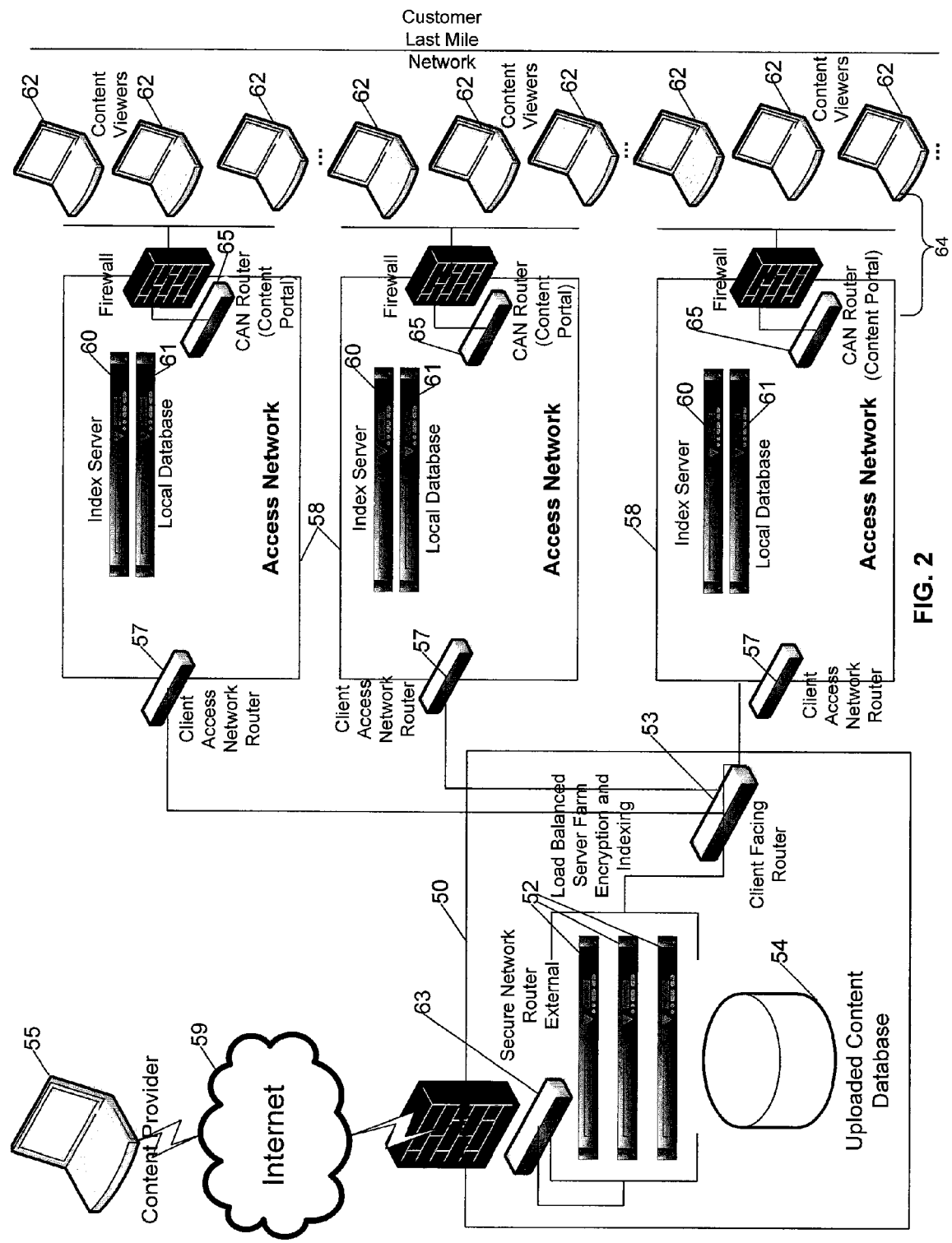
FIG. 2 is a schematic block diagram of one embodiment of a multi-source network distribution system.

FIG. 2 is a schematic block diagram illustrating an embodiment of an alternative multi-source bridge content distribution system or network for providing content from multiple sources or content providers to clients. FIG. 2 illustrates how one example of the high-level architecture for a multi-source "bridge" content distribution system or network can be designed.

The system illustrated in FIG. 2 comprises a multi-source data center 50 containing a number of multi-source servers or control modules 52 and a database module or modules 54. The data center may be housed in its own secure facility. This facility may house a number of servers and database modules that can manage the various content files efficiently, and acts as a bridge between a plurality of content providers or sources 55 and a plurality of access networks 58 serving different groups of subscribers. The multi-source data center is connected by a multi-source network 56 using high-speed lines to the various access networks 58 used by content distribution providers who contract with the multi-source service. An access network may be a cable or Internet protocol television (IPTV) network, a satellite network with a 2-wire (or DSL) backchannel, or a mobile network where the client devices are either mobile phone devices and/or personal digital assistants (PDAs).

The data center 50 ingests or receives content from many different content providers 55 over a network such as the Internet 59, via an external network secure router or first communication device 63, as generally indicated in FIG. 2. Content providers or sources 55 may be any providers of multi-media content, such as movie studios, web providers, international distributors, television networks, amateur content providers, or others. Received content is processed by an ingestion module forming part of one of the servers or control modules 52. The ingestion process is described in more detail below in connection with FIGS. 17 to 19. Ingested files are indexed with appropriate meta-data provided by the content provider and/or inserted at the multi-source data center for searching purposes, and are associated with the content provider preference settings, which will be described in more detail below. The files with associated data are then stored in data base module 54. Other data which is associated with content files is the billing system information for the content provider which provided the respective files.

Many different types of content from different content providers may be uploaded to the multi-source data center. The content providers may be network or satellite television companies, movie studios, Internet or web portals, international distributors, amateurs or independent providers, and others. Content may be delivered from the content provider to the multi-source data center over the Internet or a private network in digital form, to a secure, password-protected website associated with the multi-source data center 50. Alternatively, content may be mailed as a recording on video tape or DVD to the data center 50 for uploading to the data base system 54.

The multi-source data center is connected using a network of high-speed lines 56 to various access networks 58. This connection is via a client facing router or second communication device 53 at the multi-source data center and a client access network router or communication device 57 at each access network. Each access network has its own multi-source server 60 which links over network 58 to one of the multi-source servers 52 at the multi-source data center. A data base module 61 for storage of content files is associated with the access network multi-source server 60. The access network may be a network connected with a consumer which is owned by telephone company (Telco), cable television provider, satellite television provider, Internet service provider, or the like. Access network 58 is connected to client devices or content viewers 62 of various consumers or subscribers via its own network system 64. Content is provided to the client devices through a router or content portal 65 of each access network. Although the client devices or content viewers 62 illustrated in FIG. 2 are personal computers (PCs) or laptop computers, the client devices may also include other types of viewing devices such as television sets, video players, mobile devices, and the like. The term "access network" as used herein is synonymous with the following: Service Operator; Platform; ISP; or other type of provider of audio/video services. The service operator or content distribution provider using the access network to distribute content from the multi-source data center to the end user or consumer is not necessarily the owner of the access network which connects to the end user or consumer, but in some cases is a third party provider who leases all or part of the access network's capacity in order to operate discrete services, such as providing content from multiple sources as described herein.

Any number of access networks from all over the world may link to a multi-source data center over the multi-source bridge network as indicated in FIG. 2, or through other private or public networks such as the Internet. Each multi-source server at the access network level may initially cache or store selected content files from the multi-source data center which are predicted to be most popular for the geographical area. Content files which are predicated to be less popular may be partially stored at the access network, in order to reduce storage requirements, with the remainder downloaded from the data center on demand from a consumer or subscriber of the access network. In this case, the cached content may be 10% to 20% of the file, so as to reduce storage requirements. Certain content files which are predicted to be of little or no relevance in the geographical region served by the access network are not downloaded from the multi-source data center, but can be obtained if a subscriber should request them from the catalog of available titles.

Content files which are predicted to be popular within a geographical area are all downloaded from the Multi-Source Data Center and cached in the local MS Server 60,61 so that these content files can be played quickly and easily on request. If a user requests a partially stored content file, only the beginning ten to twenty percent of the file is available locally. However, this content file can start to play immediately upon demand. As the content file starts to play, the remaining portions of the content file are downloaded from the multi-source data center and cached "in time" for the content to play out as if the content file was present on the local server the whole time. However, using this download-while-playing technique, it may be possible that certain trick mode features do not work as a consumer would expect. For example, it may be impossible to fast-forward the content file to the end until the content file is fully downloaded into the access network's MS server.

In cases where a content file is requested and the earlier predictions suggested that the content file(s) not be downloaded at all, a message may need to be presented to the consumer requesting patience as a delay of N seconds is required to download at least a start portion of the content files. Similar to Example 2 above, the content file only needs to have a small percentage downloaded before it can start to "play". Once it starts to "play", then the remainder of the file can be downloaded.

In this embodiment, software code is provided on both the multi-source servers 52 within the multi-source data center and the multi-source servers 60 within the access network or content distribution provider's facilities. This software code is configured to coordinate all activities between the various servers in such a way as to make the distribution process effective and efficient. An embodiment of the coordinating software is described in more detail below in connection with the software flow diagram of FIGS. 16A and 16B.

The MS server 60 within the access network's facility may be connected as a remote directory to video server systems that are deployed to provide video services to their subscribers. In this way, the middleware server only needs to pass a path name and file name to the video server systems in order for the content to start playing appropriately for a given consumer. In addition, features such as "trick-play" and others may be supported.

Figure 3:
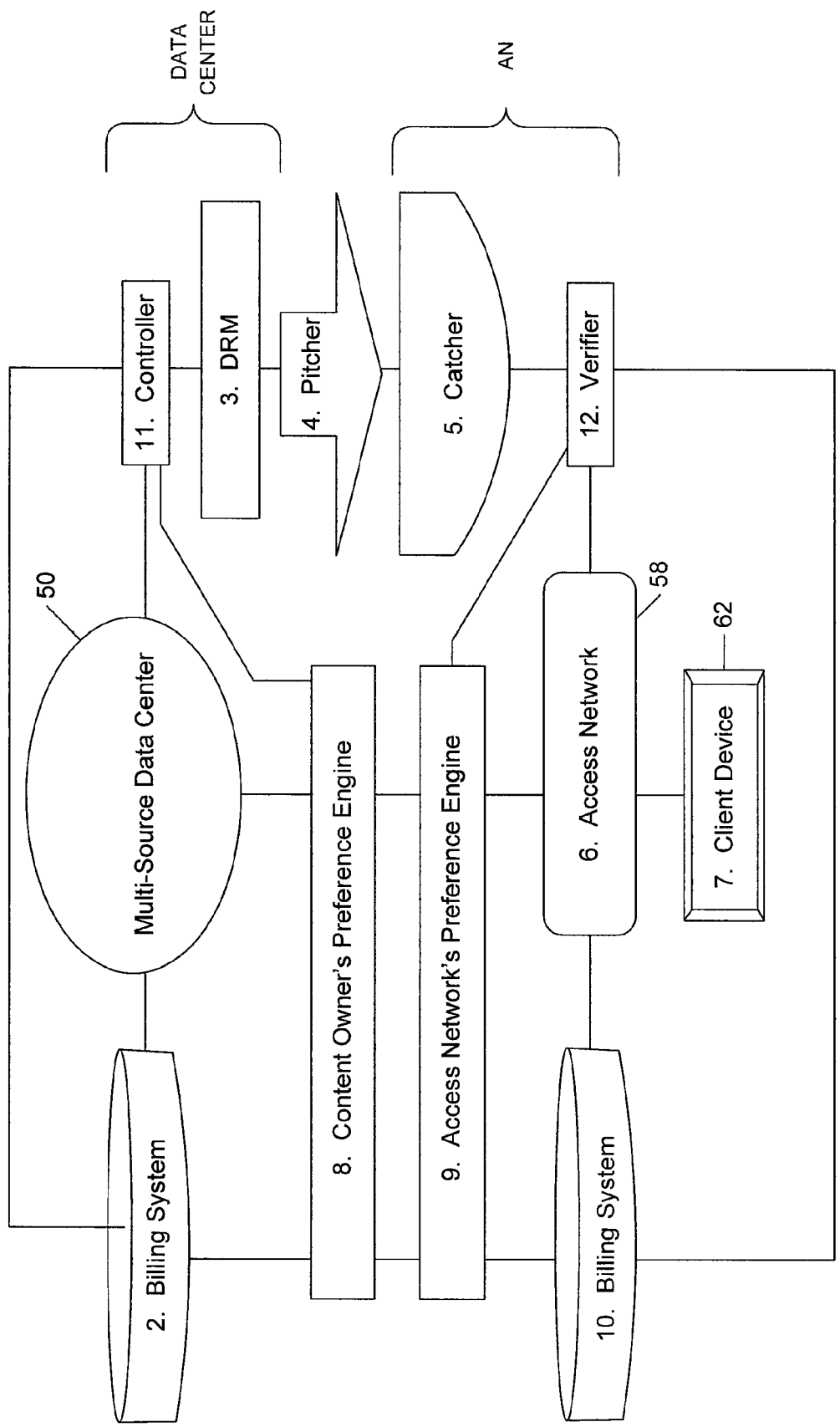
FIG. 3 is a schematic block diagram illustrating the flow path of content from a content source to a client device in the multi-source system of FIG. 2.

FIG. 3 is a simplified schematic block diagram of the flow path for a content file from the multi-source data center 50 to an access network 58, and from there to a client device 62. This flow may occur on initial set up when the distribution service provider using the access network is establishing a library of content files and partial content files of materials which are of potential interest to its subscribers, or on specific request for content from a consumer or subscriber. Each content file stored at the multi-source data center 50 is associated with the billing system 2 of the original content source or content provider, as well as the content provider's preference engine 8 of preference settings, as described in more detail below in connection with FIG. 4. The end user content distribution provider at the access network 58 is also associated with its own billing system 10 and has a preference engine 9 of preference settings. It should be understood that the term "access network's preference engine" in the following description and in the drawings refers to preference settings which are set up by the content distribution provider which provides content to the end user over the access network. As noted above, the content distribution provider may be the owner and operator of the access network, such as a telephone company, cable television company, or the like, or may be an entity which simply rents capacity from the access network owner in order to provide the content distribution service.

The billing system 2 is capable of logging individual transactions and making sure that the appropriate amount of money is paid to the content source 55. The content owner's preference engine 8 is the system that defines the criteria by which the content can be distributed. The content owner's preference engine contains the rules, agreements, geographies, policies, configuration settings, preferences and other information that allows the content to be distributed (as intended) to the appropriate access networks 58.

As indicated in FIG. 3, content files which originated with a particular content owner can flow from the multi-source data center to an access network 58 if there is a sufficiently good match between the preference settings of the content owner and access network preference engines 8 and 9, and if billing system criteria are met. The controller 11 of FIG. 3 is an optional system which is provided in the multi-source servers 52 of FIG. 2 and watches the content flowing to the access network 58 through suitable pitcher and catcher systems 4 and 5 through the multi-source server router 53 and the client access network routers 57 of FIG. 2. The pitcher and catcher of FIG. 3 may be similar systems to those described above in connection with FIG. 1. The controller 11 is the last check-point in the distribution chain that verifies the content is being sent correctly and all of the necessary steps have been taken to protect the content along its path. If the controller 11 detects an issue or problem, then content is not sent on its path to the access network 58. Rather, the appropriate error messages are sent to operations personnel alerting them of the issues. At that point, the operations personnel can either override the controller 11 to allow the content to be sent on its path, or the content is not sent until all issues have been resolved.

After the controller 11 approves the transaction, the content is prepared with Digital Rights Management (DRM) properties 3. These DRM properties in one embodiment include encryption of the data, a robust mechanism to securely pass encryption keys, and other security means such as copy control flags, broadcast flags, visible watermarks, invisible watermarks, and any other such protection and "rights management" systems and technologies that serve to protect the content on its intended path.

There are multiple DRM formats currently in use, such as Windows Media DRM, Open Mobile Alliance (OMA) DRM, DRM formats used for consumer electronics devices such as portable media players, such as Marlin DRM. The multi-source data center in one embodiment may be configured to convert a content file into different versions each having a different DRM. This allows content to be distributed to other consumer devices having a DRM scheme that is different from the DRM scheme used by the operators of the multi-source content distribution system. Alternatively, any DRM conversion may be carried out at the access network level by the content distribution provider.

Once the content has been protected with the appropriate DRM technologies 3, the content is passed to the pitcher 4, which is a mechanism that efficiently and effectively transmits the content to the access network 58. In some cases, the pitcher 4 is a satellite transponder. In other cases, the pitcher 4 may be a File Transfer Protocol (FTP) link. Various other scenarios also exist for the pitcher 4 to transmit the content in such a way as to make it economical and efficient for the access network 58 to receive it.

The counter-part to the pitcher 4 is the catcher 5. The catcher 5 is the mirror image technology to the pitcher 4. For example, if the pitcher 4 is a satellite transponder, then the catcher 5 is a satellite receiver. Likewise, if the pitcher 4 is an FTP up-link facility, then the catcher 5 is an FTP down-link facility. Pitcher and catcher mechanisms can be selected to be efficient and cost effective, and such that the catcher can receive the information being sent by the pitcher 4.

The verifier 12 is a system similar to controller 11 that checks the incoming content to make sure that it is approved for the access network 58. Verifier 12 is provided in the multi-source server systems 60 at the access networks 58. If the verifier detects a problem with the incoming data, it takes one of a number of appropriate actions. Examples of appropriate actions are as follows:

1. Buffer incoming content in a temporary holding area.
2. Delete incoming content.
3. Deliver content to access network 58.
4. Immediately notify access network 58 personnel of issues with incoming data problems and/or issues.
5. Notify access network 58 personnel of issues at a later time.

There are various options for implementing both the controller 11 and the verifier 12. The verifier 12 may be placed between the pitcher and catcher, rather than after the catcher as illustrated in FIG. 3. The function of the controller and verifier systems is to protect their side of the eco-system from errors, inadvertent or intentional misapplications of the content owner's preferences, and/or types of system failures. The controller 11, DRM 3, and pitcher 4 of FIG. 2 are located at the multi-source data center 50, along with the content owner billing system 2 and preference engine 8. The catcher and verifier are located at the access network.

The content distribution provider which distributes content using access network 58 uses its own access network preference engine 9 to indicate the criteria by which the content can be transmitted to its facility. This preference engine 9 contains the rules, agreements, geographies, policies, preferences, configuration settings and other information that serves to specify the types of acceptable content.

The content owner's preference engine 8 and the access network's preference engine 9 are coordinated systems. The content owner's preference engine 8 specifies the criteria provided by the content source 55 and stored at the multi-source data center in association with content files received from that content source. The access network's preference engine 9 specifies the criteria provided by the content distribution or service provider using access network 58 to distribute content to subscribers or end users. Each preference engine 8,9 serves to protect its own part of the eco-system. Only when the criteria for both the content owner's preference engine 8 and the access network's preference engine 9 are in agreement do content offerings from a particular content owner flow from the multi-source data center 50 to the access network 58.

The content distribution provider using access network 58 also has its own billing system 10. This is to make sure the content distribution provider has adequate incentives to offer its platform for distributing content from the various content sources associating with the multi-source bridge content distribution system. If the content distribution provider which provides content via access network 58 cannot be remunerated for supplying the content, then the access network is in danger of being relegated to a supplier of broadband access only. With the multi-source distribution system of this embodiment, the content source or providers 55 and the content distribution providers using access networks 58 are partners within the content distribution chain. Therefore, both parts of the eco-system have their own billing systems 2,10 that verify the correct payments are received as per the criteria established in the preference engines 8,9.

Each subscribing client device 62 has access to the access network 58 and all of the content offerings stored at the multi-source data base at the access network, including the content that originated from various content providers or sources 55 through the distribution chain defined in FIGS. 2 and 3. The client device 62 may be a set-top box, a mobile device, a PC oriented device, or virtually any other consumer oriented device.

Figure 8:
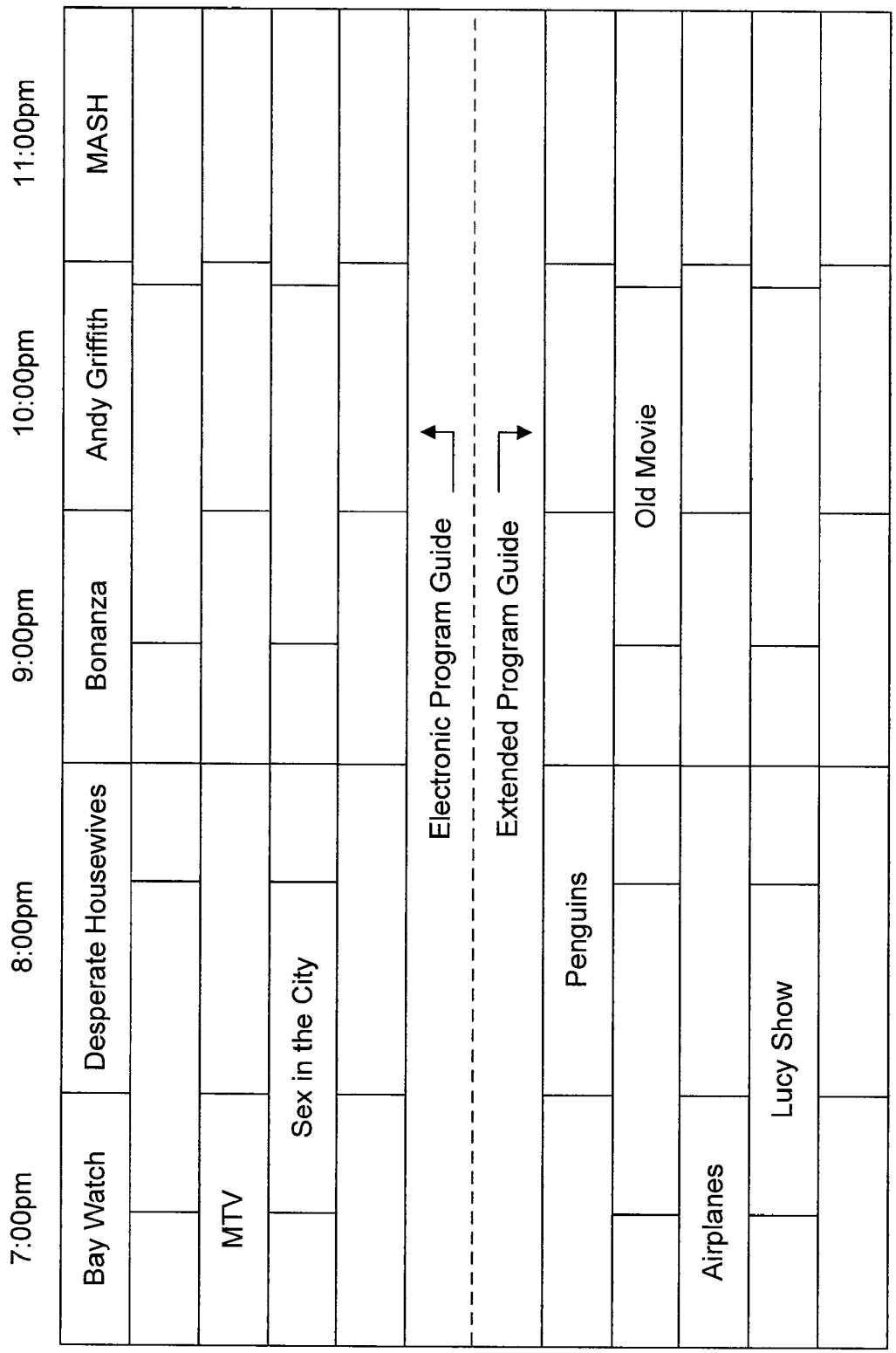
FIG. 8 illustrates an example of an extended program guide (EPG) which may be provided to a consumer using the system of FIGS. 2 to 7

Content providers 55 and end user service or content distribution providers/access networks 58 doing business via the multi-source distribution network system of FIG. 2 provide the criteria information for their preference engines 8,9 to the multi-source servers. Once these preference systems are fully deployed and the necessary criteria are input, then content potentially begins to arrive from various content sources 55 and may be provided to access networks with matching preference settings on request. The content coming in may be digital, so it can be stored as a file, although content may be an analog stream in alternative embodiments. As these files appear, they are stored in large-capacity storage servers or data base systems 54 along with their own meta-data (if any). Digital data files and/or analog data streams can then be downloaded by access networks based on the preferences in their geographic area, and stored in large capacity multi-source storage servers 60 or data bases 61 at the access network. Once these files (and any meta-data) are received, an Electronic Program Guide (EPG) of offerings to subscribers is updated so the consumer knows the content is available. An example of an EPG with multi-source data offerings is illustrated in FIG. 8.

Once the consumer uses the EPG (FIG. 8) to select content which originated with a particular content source 55, then the billing systems 2 and 10 takes the payment information from the consumer and the content begins to play. The content files may be played to the consumer as video-on-demand (VOD) sessions or alternatively as broadcast sessions, the difference being the VOD sessions are controlled by the consumer (start, stop, pause, etc.). The broadcast sessions are scheduled at a specific start and end times and are provided by the multi-source distribution center 50 directly from a content source such as a broadcast television network for downloading by the content distribution provider to the consumer, or may alternatively be provided from a peer access network if more efficient.

Figure 4:
FIG. 4 is a block diagram illustrating the criteria or preference settings provided in the content owner preference engine and the access network preference engine.

FIG. 4 illustrates an embodiment of a content provider or content owner's preference engine 8 and an access network's preference engine 9 in greater detail. As is shown in the figure, there are numerous criteria or settings in each preference engine. The settings may include issues such as geography, ratings, parental controls, pricing, preferences, DRM, copy control and localization issues. Numerous other criteria can be added as well. The preference criteria or settings may be selected as desired by both sides (content owner or provider and access network).

Once these two preference engines 8,9 are synchronized and are determined to be in agreement, then the content source 55 and the content distribution provider over access network 58 can start to enjoy a commercial relationship.

Figure 5:
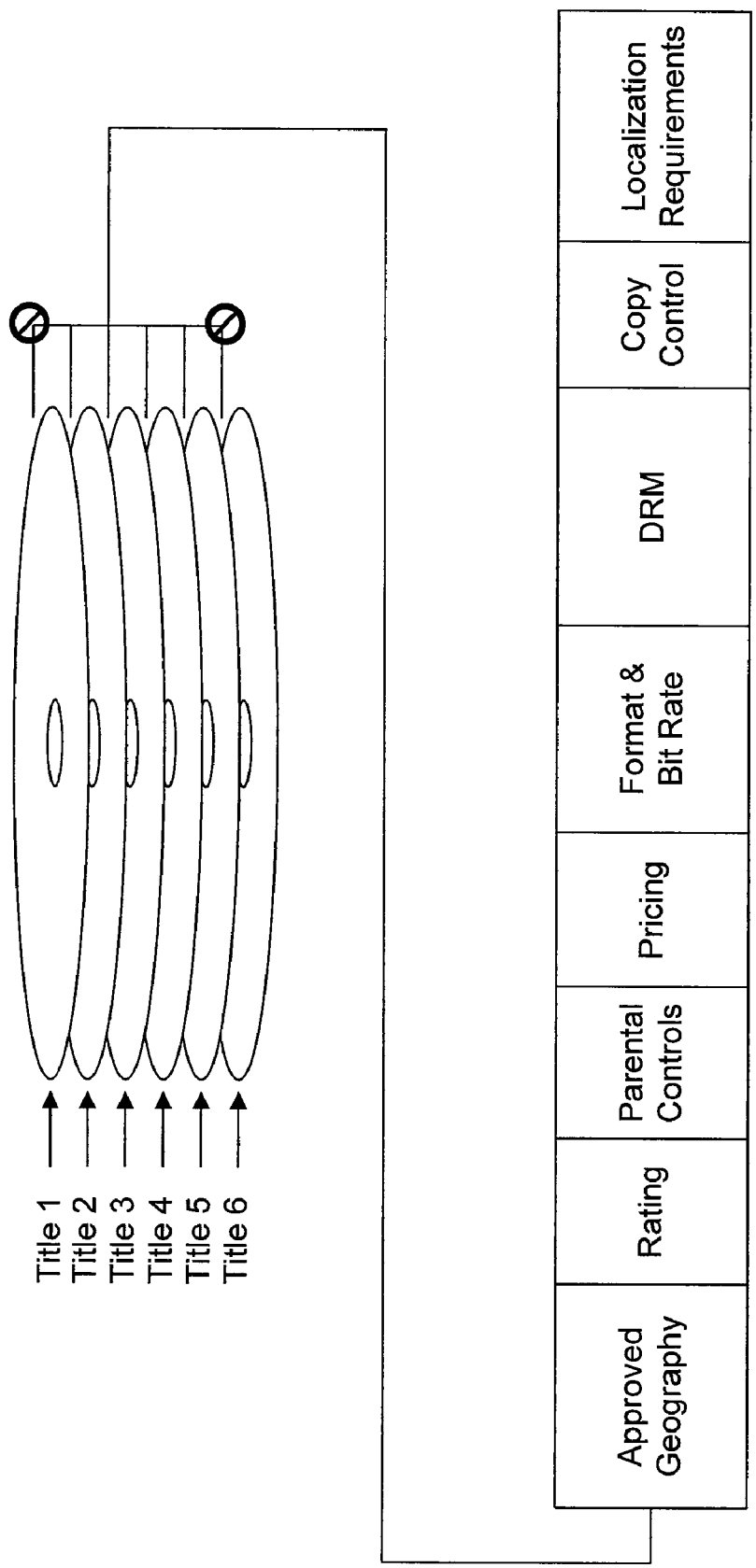
FIG. 5 is a block diagram illustrating a title-level criteria checking function provided in the system of FIG. 2.

At the extreme right-hand side of both the content owner's preference engine 8 and an access network's preference engine 9 is a field named "Titles". This field involves a title level criteria checking function which determines whether certain titles can be transmitted to the access network 58, and is described in more detail below in connection with FIG. 5.

Once it is determined that a particular content source 55 and service or content distribution provider at the access network 58 can do business together (due to the fact that there are adequate "matches" detected between 8 and 9 in FIG. 4), it becomes important to understand which titles are approved on both sides of the eco-system. Title-level criteria checking function is provided for this purpose. For an example, assume that it is determined that a large US-based cable operator and a large US broadcast network can do business together based on criteria "matches". The US broadcast network has approved the transfer of content that is 30 days after the original broadcast, however, nothing newer can be sent. Another example is a regional Telco determines it can do business with a nation-wide content aggregator; however, the regional Telco does not want any adult content. In both cases, the title-level criteria checking function is used to determine which titles are appropriate and which are not. The fields defined in FIG. 4 help to demonstrate how each title from the multi-source data base 54 can carry its own set of criteria for each title that can be "matched" with the requirements of the end user provider at access network 58 for the titles it desires to make available to its subscribers.

Figure 6:
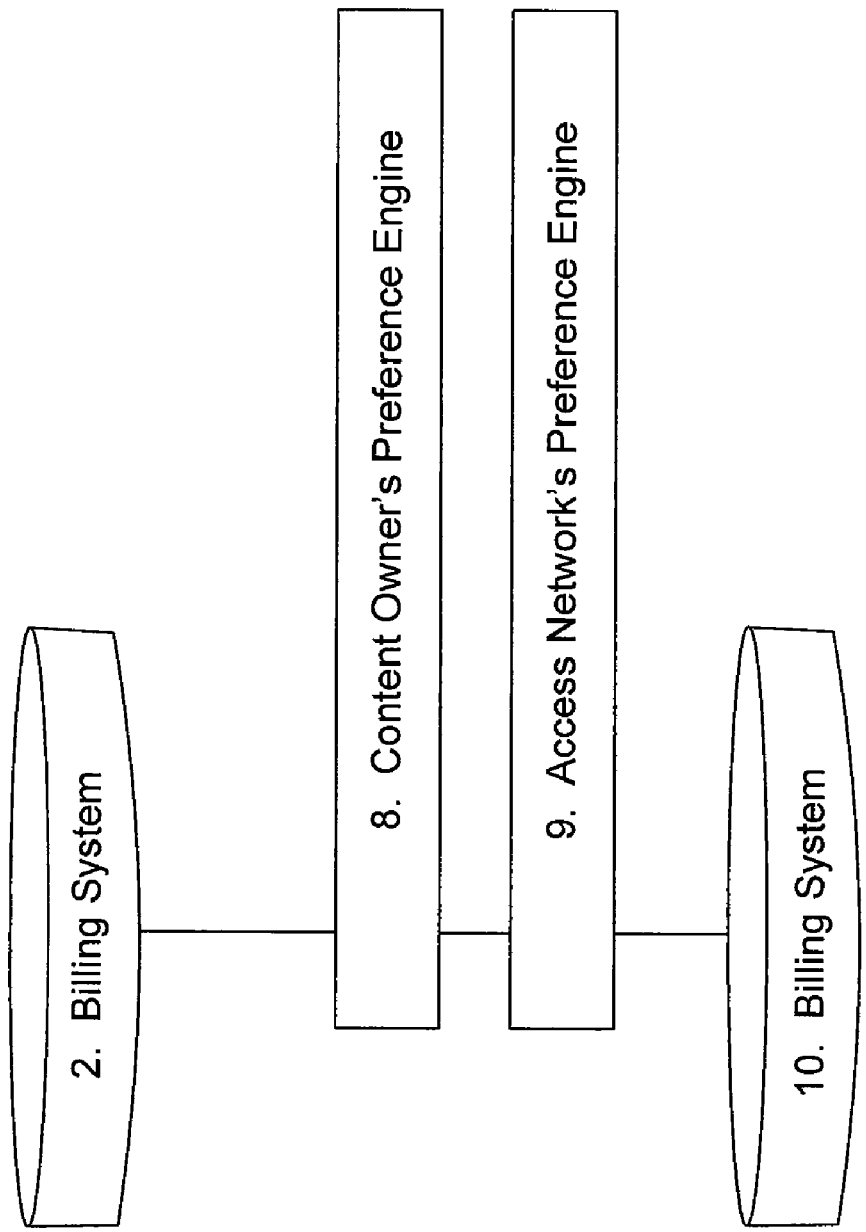
FIG. 6 is a block diagram illustrating linking of the billing systems with the preference engines of FIG. 4.

FIG. 6 illustrates linking of the preference settings 8,9 and billing systems 2,10 of the content source 55 and the content distribution or service provider at the access network 58. This linkage creates and maintains new distribution channels for the content owner(s), and provides incentives for the service providers using the access networks to provide content to subscribers to offer content selections other than their own. It also provides the consumer with a smaller number of discrete service offerings and component parts to deal with in obtaining desired multi-media content.

It is possible that multiple, separate set-top-boxes and/or personal computers could be connected in such a way as to mirror this same capability by downloading content separately from different sources. However, these various components are often complicated and expensive. Also, it is hard to provide seamless time-shifting and location-shifting capability without adding more devices and technologies (empowered to control all of the various devices.) The present system allows a content source or provider and a distribution or end user service provider using access network 58 to work together in order to provide content to the consumer over a multi-source bridge network which requires a reduced number of devices and which may reduce costs. Using this approach can enable a unified commercial relationship with a consumer operating a single integrated user interface.

Figure 7:
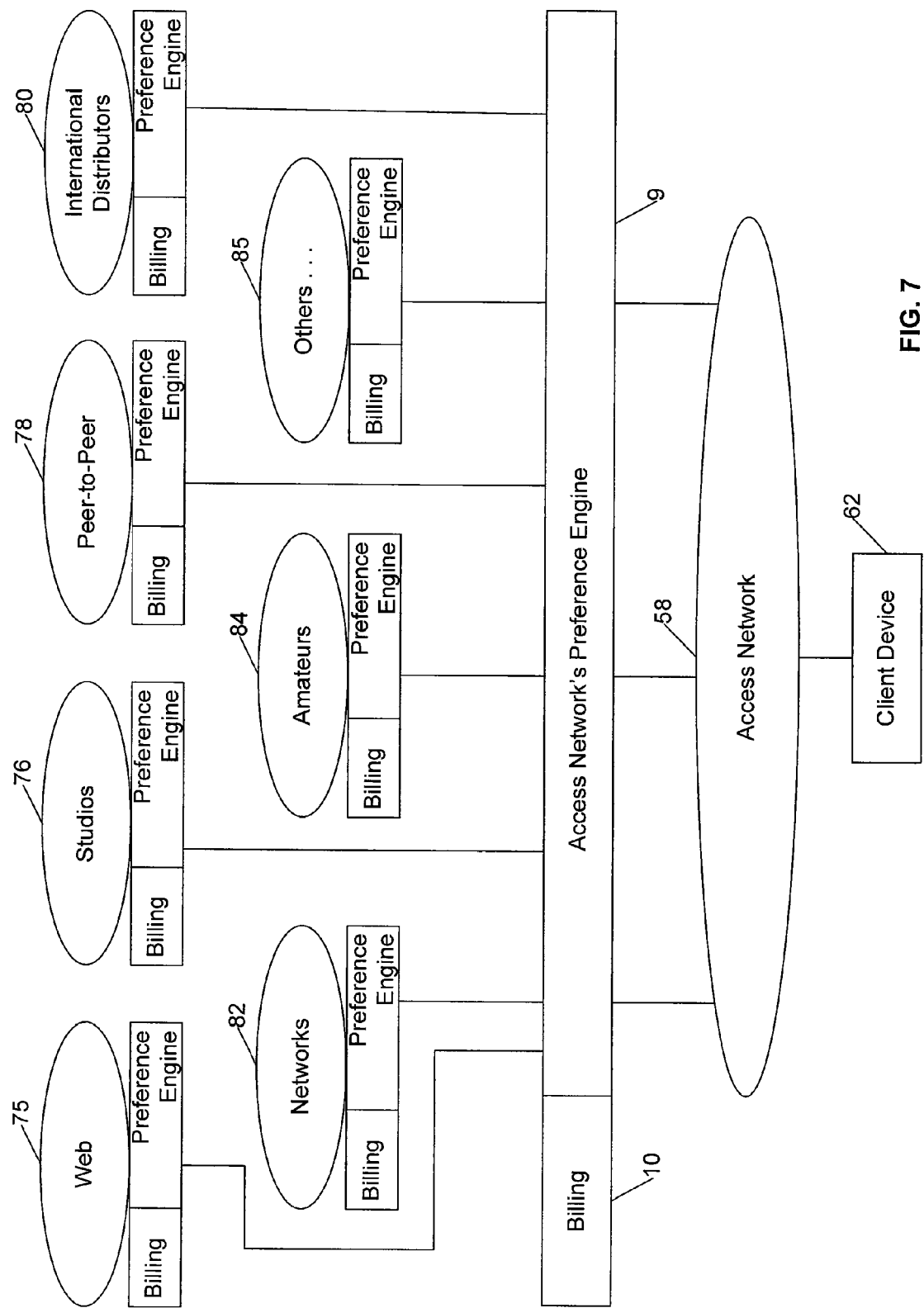
FIG. 7 is a block diagram illustrating various content sources which may provide content to the multi-source network distribution system of FIG. 2.

FIG. 7 provides an overview of various types of multi-source content which may be available for distribution to end users via access networks. The sources of content may include Internet or web sources 75, movie, television, or other media providing studios 76, peer-to-peer sources 78 (access network to access network, as described in more detail below), international distributors 80, networks 82 such as television or cable networks, amateurs 84, and other content sources 85. This content may be obtained by a particular end service provider from a multi-source data center 50 or from another end service provider utilizing another access network 58 (peer-to-peer). As indicated, each stored content source is associated with its own billing system and preference engine, which are matched with the end service or content distribution provider's billing system and preference engine. Amateurs can provide their content over such a distribution network as long as the criteria are sufficient to meet the needs of the access network 58. Amateurs may use an Application Service Provider (ASP) service (over the web) for their content rather than maintain their own servers to host the content owner's preference engine 8. As long as there is adequate filtering of preference settings on both sides of the eco-system and the linkage of the billing systems 2 and 10, content can flow to the consumer, and the fracturing of content can be minimized.

FIG. 8 illustrates an example of an extended program guide which may be provided to an end user or consumer in the system of FIG. 2. This illustrates how a normal Electronic Program Guide (EPG) can be extended to show the additional content offerings that might be available in the multi-source distribution system of FIGS. 2 to 7. At the top of the Extended Program Guide, the broadcast television offerings directly from the access network are listed. At the bottom of the Extended Program Guide, broadcast television offerings from content sources outside of the access network's normal offerings are listed.

The end user service provider or content distribution provider utilizing access network 58 to distribute multi-source content could offer a fixed number of viewing hours (for the extended television offerings) per month, or a flat rate for unlimited viewing, or al la carte viewing selection of titles or other packaged offerings. After those hours are consumed, there would be an extra charge for the additional viewing hours. These revenues would then be split between the access network and the content source or sources. These extended broadcast channels may be integrated into the existing EPG, providing a simple and fully integrated method for time-shifting (by way of personal video recording) and location-shifting (by way of a home gateway or similar localization technologies).

Figure 10:
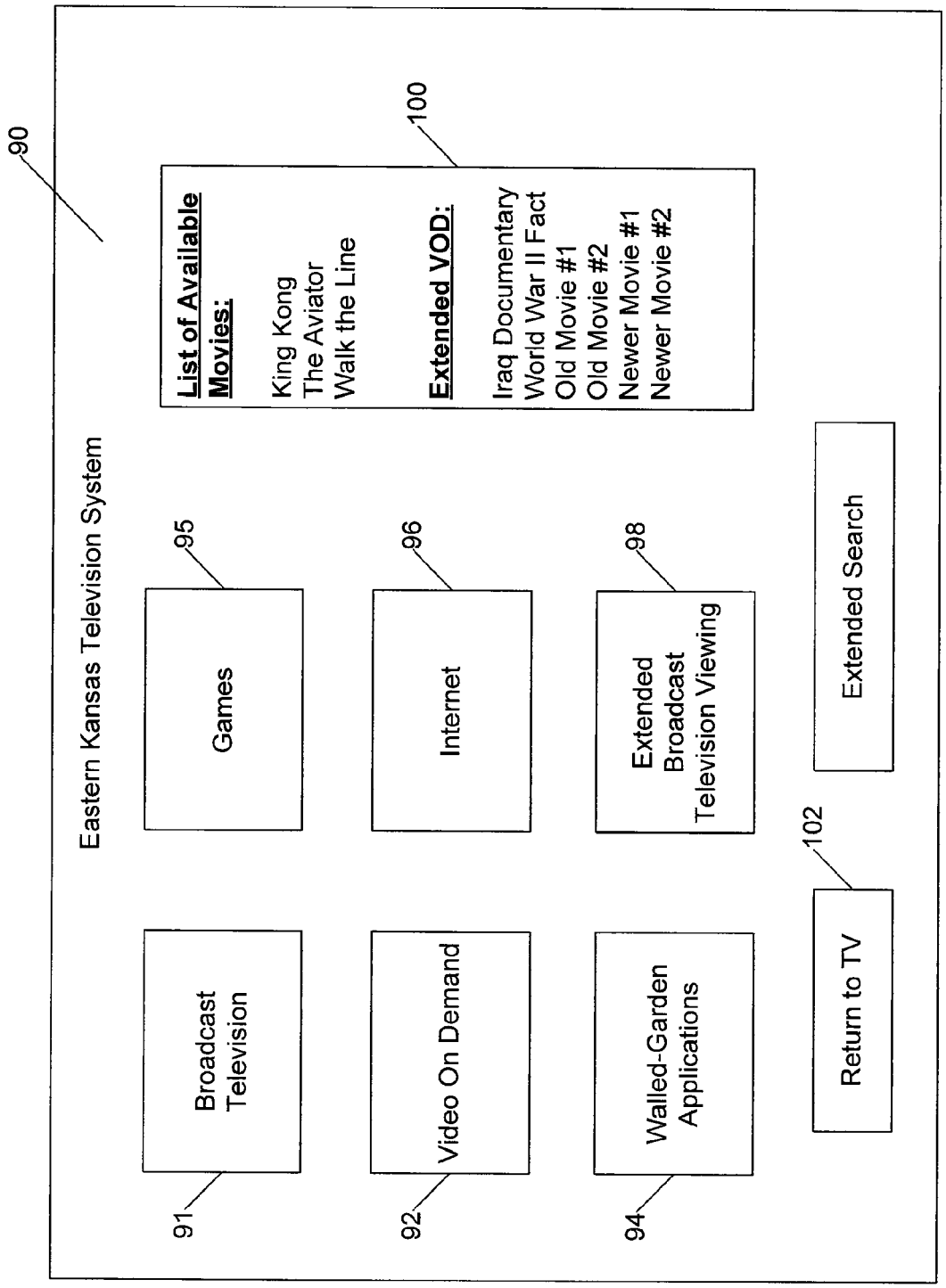
FIG. 10 illustrates a user interface for a middleware system provided by the access network in one embodiment.

The extended and integrated content offering also provides search capability. The search capability can be provided to the consumer by way of a middleware system as illustrated in FIG. 10 or through the extended EPG of FIG. 8. FIG. 9 illustrates an example of a suitable search input form or simple user interface for a content search engine which may be located at the multi-source data center or MS server at an access network level. The consumer enters search criteria on the user interface. By filling in all or part of this form, the consumer is able to search for content offerings around the world. Such a search is performed by examining the various meta-data elements that have been previously filed and categorized at the multi-source data center, and stored with the content files in data bases at both the multi-source data center and at the access network The meta-data is created by known software programs that examine video information and create meta-data on the software's best interpretation of "what is going on". After completing the search, the search engine comes back with a list of content files which contain content according to the consumer's entry on the search form of FIG. 9. Once the consumer finally selects the desired content, as detected by the search engine, the transaction is consummated, the consumer is charged, and the billing systems appropriately split the revenues (between the content source and the access network.).

FIG. 10 illustrates an example of a simple user interface screen 90 for a middleware system which may be provided by the end user service or content distribution provider at the access network level. Such a middleware system can provide standard offerings such as broadcast television viewing 91, video-on-demand 92, and walled garden applications 94 (such as ordering pizza delivered to the home, and home shopping). In addition, offerings such as games 95 and Internet access 96 are also possible for such a middleware system.

The middleware system of FIG. 10 also provides extended broadcast television viewing 98. This option can show extended content (provided by external content sources) in a scheduled, linear broadcast format (similar to broadcasts from the large US broadcast networks.)

Another feature offered by this middleware system is extended VOD 100. These are video offerings that are selected and played like a standard VOD offering. In one embodiment, the extended VOD offerings would be charged on a per-viewing basis. Once the payment is collected from the consumer, the revenue is split appropriately as agreed by the content source and the end user service provider at the access network level. An extended search button 102 on the middleware operator interface screen allows a consumer to search for extended content titles (for either a broadcast session or a VOD session.) The search engine can be enhanced by the inclusion of a recommendation algorithm which highlights the content according to the user's past viewing habits or expressed interests. A "return to TV" button allows the consumer to return to regular broadcast television.

The middleware system client software can be supplied using two different methods as follows:

1. The middleware pages and APIs (source code) can be provided to a content distribution provider using the access network in order for the content distribution provider to develop and implement their own multi-source (executable) client.
2. The multi-source client can be a discrete set of compiled client code that is developed and tested independently and is made available to set-top-boxes or other client devices as an executable library of code. This way, the set-top-box can receive this library by way of a simple upload of the executable middleware code into the set-top-boxes longer-term memory.
3. The look-and-feel can be adapted by using customizable "skins" (images) to match the needs of the access network.

The search capabilities or search engines described above may allow for search processes that start at specified times during an hour, day, week, month, or even within a year. These processes proactively searches for titles and criteria and return a list of content titles that match the specified search criteria. Another name for these processes is "auto-bots". There can be numerous "auto-bots" on such a network that search the content library (or libraries) for selected criteria. Once again, the result is a list of content titles that can be further investigated by anyone using such a network. Given this system's design, it is possible to launch a number of "auto-bot" programs that search the content library (or libraries) while simultaneously filtering out unwanted content (as specified herein).

In the foregoing embodiment, an end user service or content distribution provider uses an access network to offer content from worldwide sources to end users or consumer, using the infrastructure identified above. However, the content distribution provider may use other pipelines for providing content to end users. In an alternative embodiment, in addition to the option of providing content using the infrastructure of FIG. 2, the consumer may make an extended content selection and choose to have the content transmitted to the consumer by way of a different network. For example, the consumer may select a video about penguins from the extended content source and have this video transmitted to the consumer in one of the following ways:

As an email to the consumer's PC
As a DVD that is shipped by mail
By way of an alternative network
One of a number of "Just-In-Time" methods
Wireless methods
Numerous other methods that may not be utilizing the access network's resources directly.

Figure 11:
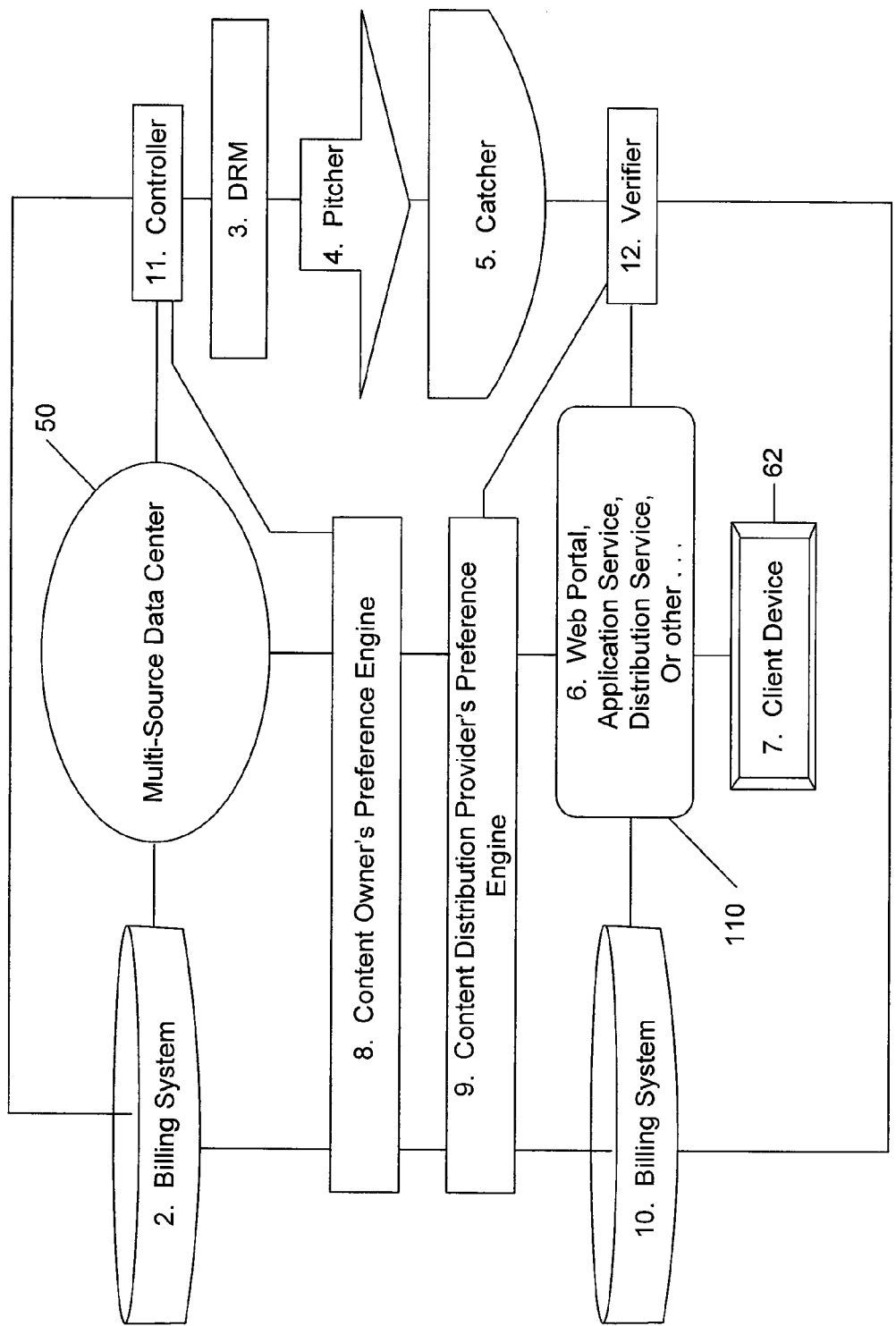
FIG. 11 illustrates a modified flow path for data files via a multi-source bridge network distribution system according to another embodiment in which no access network is provided.

FIG. 11 illustrates an alternative embodiment in which the access network is replaced by another type of content distribution entity 110. Example of such a replacement scenario may be two web portals or between a web portal and an application service provider. The system illustrated in FIG. 11 is otherwise identical to that of FIG. 3 and like reference numerals have been used for like parts as appropriate. FIG. 11 illustrates how the same infrastructure can be used to negotiate, distribute, and bill for content between two entities where the content distribution or end user service entity is not using an access network for content distribution.

Figure 12:
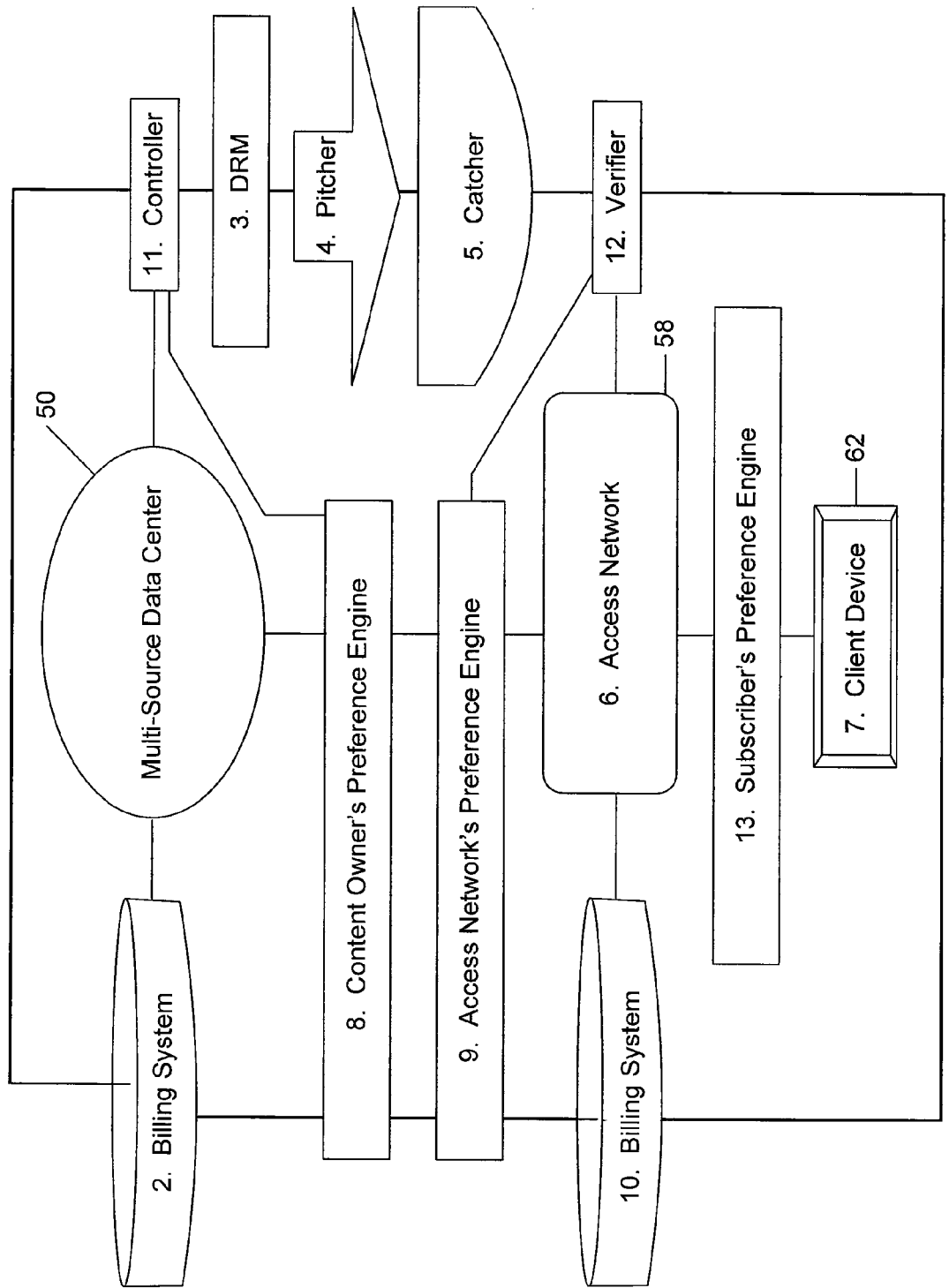
FIG. 12 is a block diagram illustrating content flow another embodiment of a multi-source bridge content distribution system including a subscriber or customer preference engine.

FIG. 12 illustrates a modification of the system illustrated in FIG. 3 in which a subscriber's preference engine 13 is provided within the architecture of the network. Other modules in FIG. 12 are identical to those of FIG. 3 and like reference numerals have been used as appropriate. FIG. 13 illustrates an example of parameter settings for such a network. The subscriber's preference engine 13 in FIG. 13 provides an example of the types of preference settings that might be set by a typical subscriber, such as ratings, parental controls, pricing, and others. Given such a preference engine dedicated to each individual subscriber on a network, the subscriber can likewise indicate the parameters, specifications, and/or other qualities for content to be transmitted into the subscriber's environment.

Figure 14:
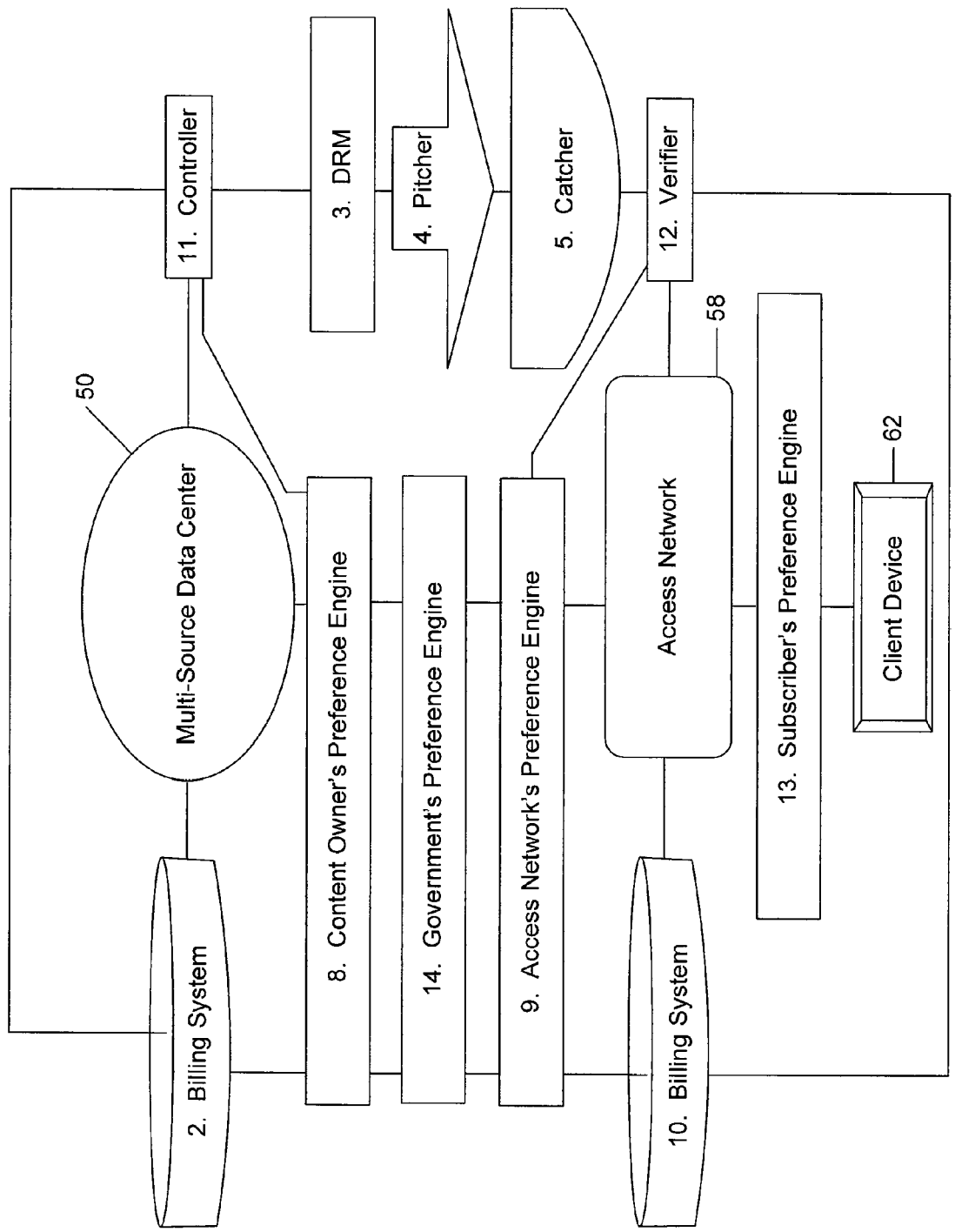
FIG. 14 illustrates another modified flow path for content in a multi-source bridge network distribution system which includes a government preference engine.

FIG. 14 illustrates a modification of the embodiment of FIG. 12 in which an additional layer of preference settings is provided, specifically a government's preference engine 14. This preference engine provides the ability for a government (or other institutional body) to have a dedicated and discrete preference engine for control of content distribution using the multi-source distribution system of FIG. 2. Examples for such a government's preference engine are illustrated in FIG. 15, which indicates the relationship between the four preference engines of FIG. 14 in one possible embodiment. Using this approach, the governmental rules, regulations and policies can be clearly specified so content is appropriately filtered out of the network and away from potential subscribers.

One example of the use of a governmental preference engine 14 as illustrated in FIGS. 14 and 15 is to prevent distribution of material contrary to the law of a country or region. For example, in Japan, adult content can be distributed to the adult population, however, human genitalia cannot be made clearly visible. Instead, large blocks of underlying pixels are created and arranged in such a way as to blur the image. The intent is to provide the viewer with a very good idea regarding what is going on without showing everything clearly. Such a blurred portion of the image is often called a mosaic. Therefore, it is common for people to discuss the mosaic effect used in adult content within the country of Japan. With the use of a government preference engine in the multi-source distribution system of FIG. 2, the service operators or content distribution providers in Japan can be assured that adult content:

1. Reaches legitimate adults;
2. Reaches a population of people who have their Subscriber Preference Settlings configured to "Adult Content is OK"; and
3. Has the mosaics in all the right places within the video.

Since standards of acceptability vary from jurisdiction to jurisdiction, use of a government preference engine can be advantageous in ensuring content is acceptable in all jurisdictions where it can potentially be distributed.

The government preference engine can also be greatly expanded to filter (or censor) content that is believed to be harmful to the population at large. The country of China is a good example, however not the only example. Chinese or other governments may set their own preference engines in such a way that only approved content would flow through to potential subscribers on the network who are within their jurisdiction.

FIG. 15 illustrates how four different preference engines 8, 14, 9, and 13 can be arranged in such a way as to appropriately access and/or filter content selections as required by the participants within the multi-source distribution system. There are several ways that such preference engines can work, as follows:

1. Meta-data provided by the content owners for each title can be used to determine if a preference setting is (or is not) a match for that title.
2. Human operators can physically examine the content and create the necessary meta-data for the content.
3. Software programs can examine the content and create the necessary meta-data for the content.
4. Any combination of options mentioned above (1-3).

In one embodiment, the content owner uploads their content. As they are uploading their data, they have a chance to upload meta-data (if it exists) as well. In addition, trailers, art-work, and other data that supports the content can be uploaded as well. After such content is uploaded, a software program is initiated that examines the content to try to determine whether there is a match between the supplied meta-data and the actual images. If no meta-data was supplied by the content owner, such a software program would try to build its own meta-data file. As a last step, human operators paid by the multi-source distribution network may view the video and verify the meta-data is correct. Once these steps have been taken, the access network operators can be reasonably well assured the meta-data is correct and the various search mechanisms can operate according to their specifications and criteria settings.

Although the major Hollywood studios have a standardized method for rating television and feature film product, the rest of the content community does not. Therefore, what may be considered an adult film by one content provider may be considered Parental Guidance (PG) film by another. A content certification function (or service) may be provided within the multi-source content integration network described above, in one embodiment. This allows the content sources (either from the major film studios or outside of the major film studios) to have experienced personnel evaluate the content and provide a rating according to standardized practices within the industry. Such a service would take the titles before they were available on the multi-source distribution network. Experienced personnel would view the content and render the rating as is appropriate for the consumers who may wish to view this content. In one embodiment, the content owner may be charged for such a service as this may tend to increase the attractiveness of the title.

In an embodiment where sophisticated software or experienced personnel within the multi-source system evaluate content, a multi-source rating system may be provided to appropriately categorize the various content materials found to be in the system. Rating systems can include a myriad of metrics including (but not limited to) violence, adult content, language, appropriate for certain ages, appropriate for certain countries, appropriate for certain religions, and the like. These categories can be fields within the databases that hold the content assets. The ratings can be used along with the preference engines described above.

In addition to the preference engines and rating systems described above, the multi-source distribution system may include extra protection mechanisms that can be used to further protect individuals such as children from experiencing inappropriate or un-wanted content materials. Examples of such extra protection mechanisms are:

In the case of content previously censored and found to be approved for children, hash codes (or other cryptographic means) may be employed to verify the content has not been tampered with after such a censorship process has taken place.

Running dedicated software programs against content (web or file based) in order to search for content that might be inappropriate for children.

Other technologies and/or mechanisms that can be deployed within the multi-source framework to further protect children.

Figure 16A:
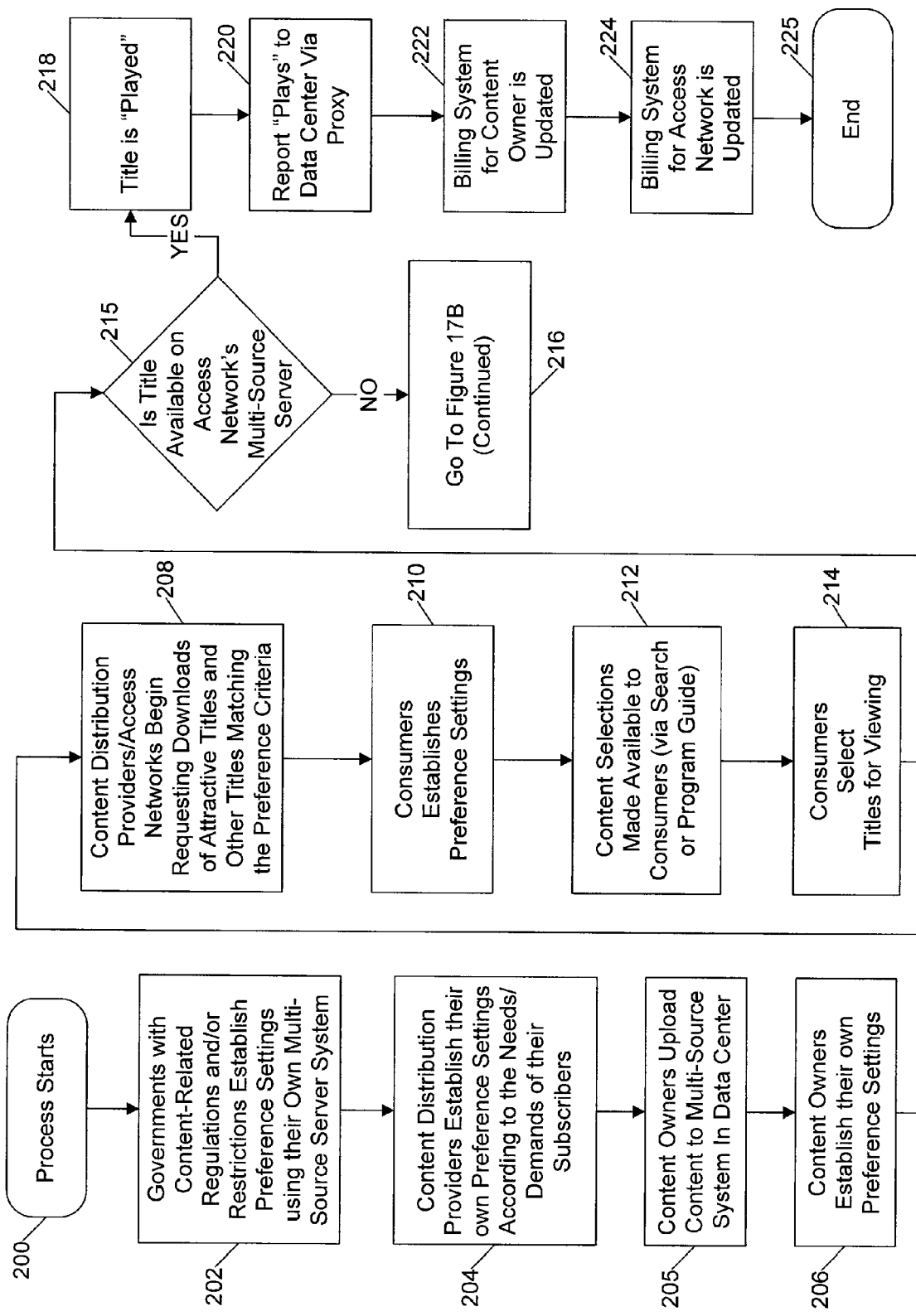
FIGS. 16A and 16B illustrate a process flow diagram for the multi-source bridge content distribution system of FIGS. 2 to 15 with the preference engine arrangement of FIGS. 13 and 14.
Figure 16B:
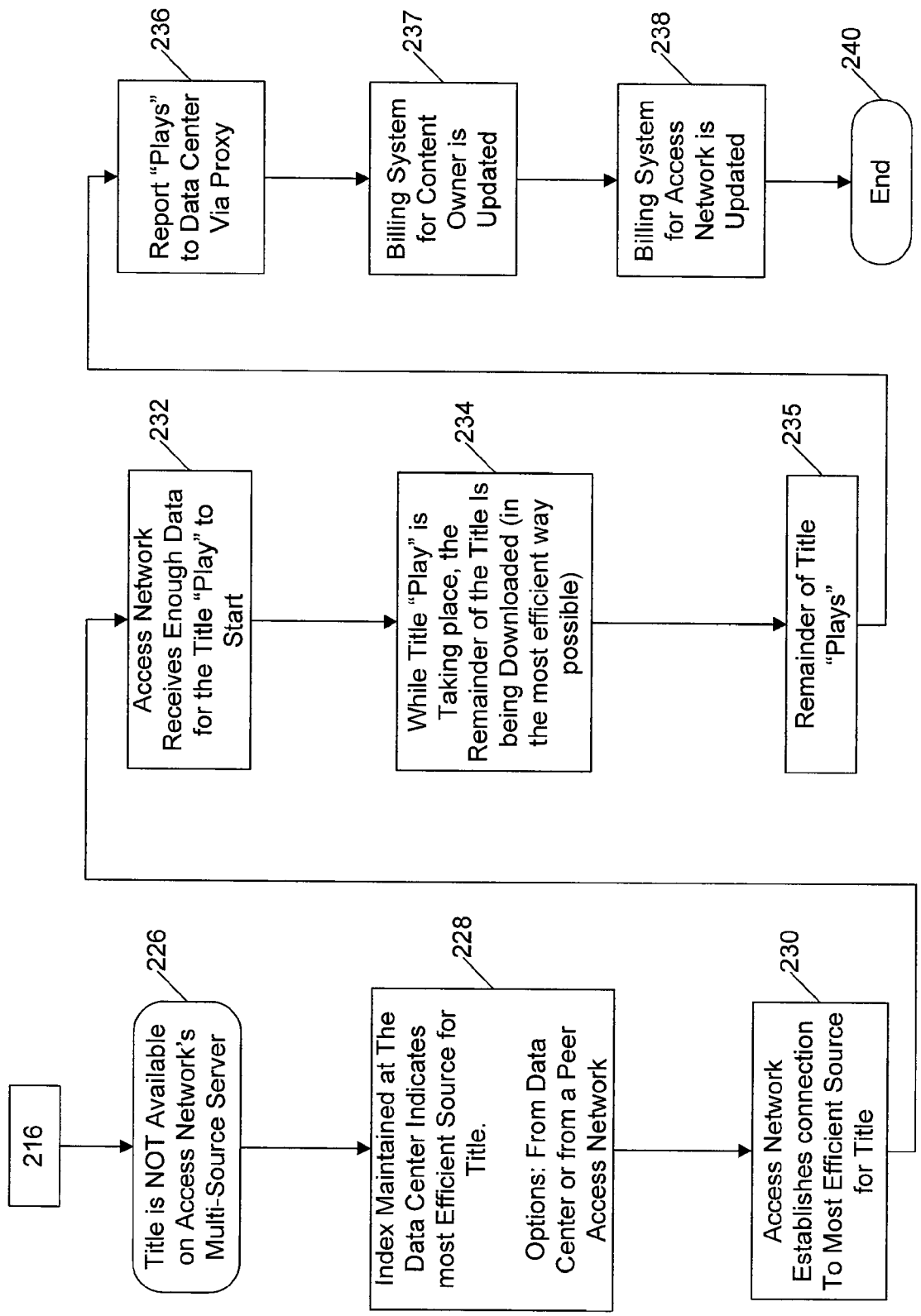

FIGS. 16A and 16B illustrate a flow diagram of the steps in a multi-source distribution method according to one embodiment, which uses the overall system of FIG. 2 to distribute content in the manner indicated in FIG. 14, in which four preference engines are utilized to determine whether particular content can be appropriately distributed to a consumer or end user. At the start or system set up stage 200, government or other institutional bodies having content-related regulations or restrictions establish preference settings for the government's preference engine 14 using their own multi-source server system (step 202). Content distribution providers who subscribe to the multi-source distribution system establish their own preference settings at step 204 using their multi-source servers 60, according to the needs/demands of their subscribers. This establishes the access network's preference settings 9.

Content owners or content sources 55 upload content to the multi-source system in data center 50 of FIG. 2 in step 205, and set up their own preference settings with the multi-source network for content owner's preference engines 8 in step 206, using servers at the multi-source data center. In step 208, content distribution providers/access networks begin requesting downloads of attractive titles and other titles matching their specific preference criteria from the multi-source data center 50. Consumers or subscribers to the various content distribution providers are invited to establish their specific preference settings at step 210, when they sign on for the multi-source service. At step 212, multi-source content selections are made available to consumers, via the extended program guide or via the search capability described above. Consumers can then select titles for viewing (step 214). At step 215, the multi-source system at the access network determines whether the selected title is available on the access network's multi-source server. If available locally, the title is played (step 218), the "play" is reported to the multi-source data center via proxy (step 220), and the billing systems for the content owner or provider and for the content distribution provider (at the access network level) are updated with the distributed charges for the viewing of that particular title (steps 222, 224). The process is then ended (225).

If a requested title is not available on the access network's multi-source server (step 226, FIG. 16B), an index maintained at the multi-source data center 50 indicates a source for the title, either from the titles stored at the multi-source data center or from titles stored by a peer access network (step 228). The access network then establishes a connection to the most efficient source for the title (step 230), and receives enough data for the title to start to play (step 232). While the initial data of the title is starting to play, the remainder of the title is downloaded (step 234). The remainder of the title then plays (step 235). The playing of the title is reported to the data center 50 via proxy (236), and the billing systems for both the content owner or provider and the content distribution provider (access network) are updated (steps 237 and 238). The process is then ended (240).

Figure 17:
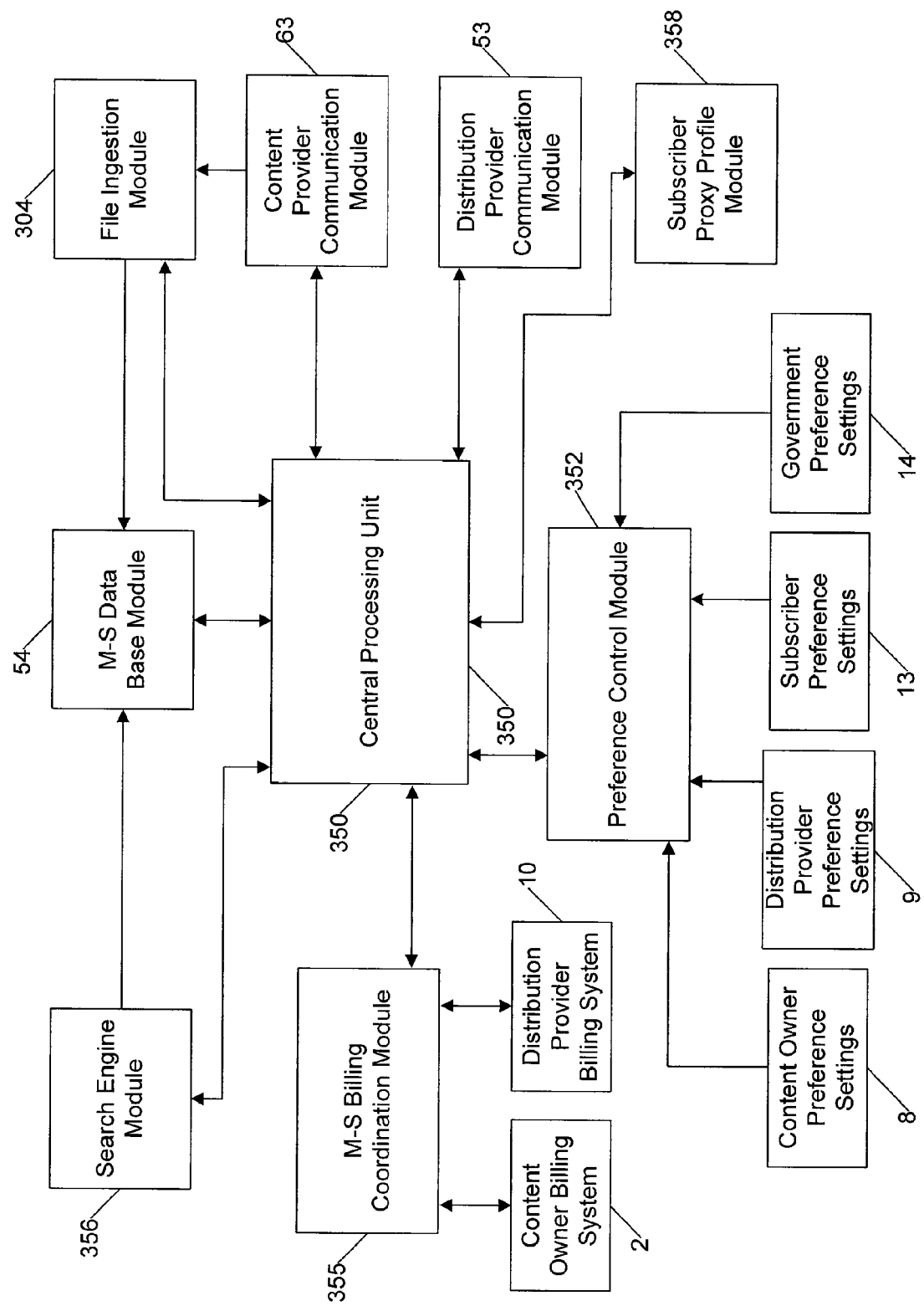
FIG. 17 is a more detailed functional block diagram of the multi-source content distribution system of FIGS. 2 to 16.

FIG. 17 is more detailed functional block diagram of one embodiment of the multi-source content distribution system of FIG. 2. Some modules or blocks of FIG. 17 have been described above in connection with FIGS. 2 to 15, and like reference numerals have been used as appropriate. The modules of FIG. 17 may all be provided at the multi-source data center 50 of FIG. 2, or some may be provided at the data center while others are provided at the distribution providers or access network level. Additionally, each module may be split into more than one separate unit, for example there may be several multi-source data bases, or combined with other modules in one or more of the servers 52, 60 illustrated in FIG. 2.

As illustrated in FIG. 17, central processing unit or controller 350 is linked to the data base module 54, the first or content provider communication module 63, and the distribution provider module 53, so as to control ingestion of files from content providers and supply of content files to content distribution providers. The central processing unit 350 is also linked to a preference control module 352 which is adapted to compare the preference settings of the four entities 8,9,13, and 14 as described above in connection with FIG. 15 so as to determine whether or not a requested content file can be supplied to a subscriber. A file ingestion module 354 linked to the content provider communication module 63 processes incoming files as described below in connection with FIGS. 18 to 20, before providing the processed files to the data base module 54. A billing coordination module 355 is configured to link the content owner billing systems 2 and the distribution provider billing systems 10 so as to coordinate and share billing between the two entities for each completed transaction.

Search engine module 356 linked to the central processing unit 350 is configured to search for requested subject matter in the meta data of files stored in the multi-source data base module 54, based on search requests received from subscribers through their associated content distribution providers, as described in more detail above in connection with FIGS. 8 to 10. A subscriber proxy profile module 358 is configured to collect subscriber profile information based on the types of content files requested and to associate subscriber profiles with a proxy, as described in more detail below in connection with FIGS. 21 and 22.

Figure 18:
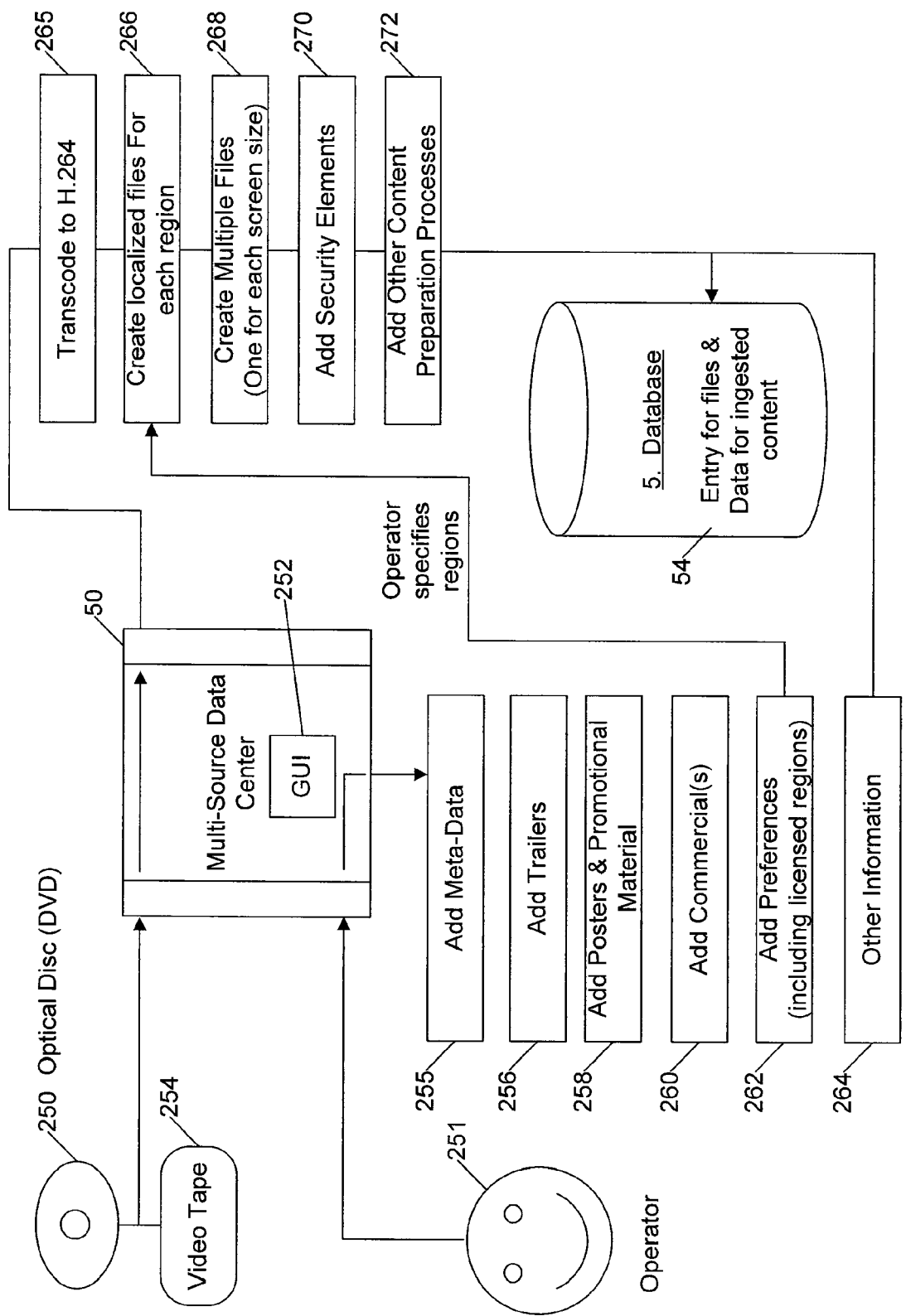
FIG. 18 illustrates an embodiment of the content ingestion module for upload of content from a content source to the multi-source data center of FIG. 2.

FIG. 18 is a high level illustration of an embodiment of the content or file ingestion module 354 of FIG. 17 for the multi-source data center 50. In order to upload content files to the multi-source data center, the operator 251 at the content provider may upload stored digital content files from its hard drive directly to the multi-source server over the web. Alternatively, if the content is only available as a digital video disk (DVD) or video compact disk (VCD) 250, the digitized content may be uploaded into the multi-source data center 50 via a graphical user interface (GUI) 252. Such a graphical user interface makes the content ingestion process relatively easy and may also reduce any confusion that might otherwise exist (since it is anticipated that various content owners from around the world may be using this content ingestion system). The system may also be designed to ingest content from a digital tape 254. A digital tape reader may be used to up-load the contents of a digital tape into the multi-source data center or system.

Each content file may have information added by the system user by way of direct input or file uploads, such as one or more of the following: meta-data 255, trailers 256, posters and promotional material 258, commercials 260, preference settings 262 as described above (which may include licensed regions in addition to any of the other preference settings discussed above and illustrated in the drawings), and other information 264. Meta-data 255 may be added by the content owner or provider, but more sophisticated reviewers may also be used in order to verify that content files are properly classified and described and may also add other meta-data in some cases. For an example, a content owner may wish to fool the multi-source distribution system by posting content named "Barney goes to Kindergarten" which actually contents adult material. All supporting information (and logic) tells the system that this piece of content is intended for young children. Humans (or very sophisticated software programs) may review the content in order to verify that the meta-data is correct, and in this case will correct the meta-data to reflect the adult content.

Once the contents have been loaded into the multi-source system then the following processes takes place. The content files are transcoded into a compressed format (step 265). An example of such a current-day compressed video format is H.264 (or MPEG-4, part 10). The compressed file format enables a large number of video files to be stored at the multi-source data center.

In one embodiment, subtitles and additional localization 266 are used in order to create localized files for each geographical region where the content may be offered. Such localization may be performed with automated means in some cases (such as a software program that performs a speech-to-text operation and then creates its own subtitled meta-data). If an automated process cannot be used (for one reason or another), then a human may need to perform the localization processes manually.

After the localization processes are complete, then discrete files are created for each geographical region. For example, content files may be created as follows:
a. 1999 World Series final game subtitled and localized for Japan;
b. 1999 World Series final game subtitled and localized for Korea;
c. 1999 World Series final game subtitled and localized for Taiwan;
d. 1999 World Series final game subtitled and localized for Russia;
e. and so on.

For each title, multiple files (one for each screen size) are created (268). Once the localized files are created, then each one is encrypted using an encryption and cryptographic system (270). One suitable encryption and cryptographic system is offered to the public by the company Verimatrix, Inc., based in San Diego, Calif. Other content preparation processes (272) can also be included as needed at any point from the time of initial ingestion until all data elements are stored in the multi-source system's data base 54. The content files and the supporting meta-data and other materials are added to the systems database so that they can be relatively easily accessed and retrieved in the future.

Figure 19:
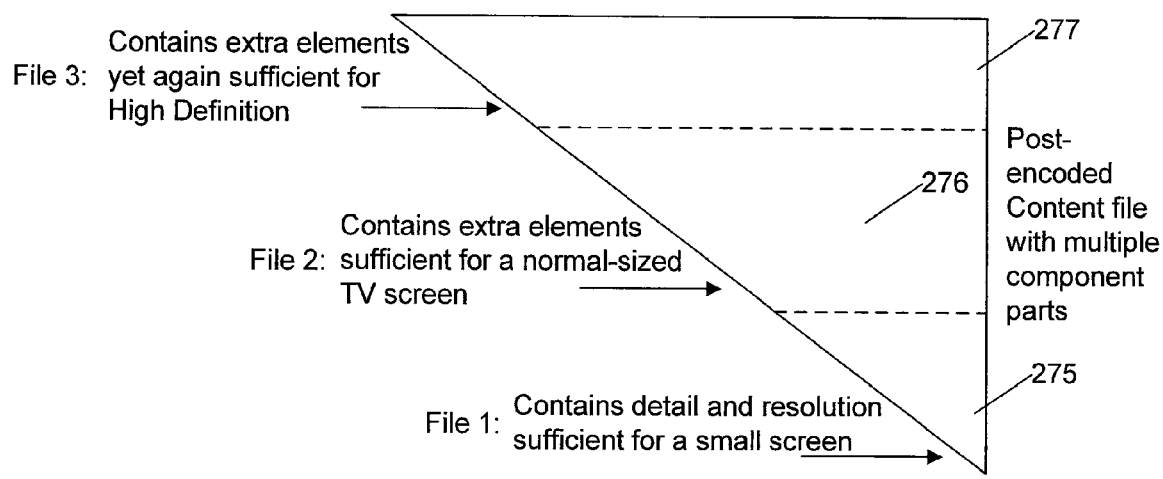
FIG. 19 illustrates an alternative resolution process within a file encoding method for the content ingestion of FIG. 18.

In an alternative embodiment, multiple layers of files may be created during the encoding process. FIG. 19 illustrates an example of multiple layering in the encoding process. For a given piece of content, multiple discrete files 275, 276, 277 can be created. If the content is intended to be sent to a Quarter Common Intermediate Format (QCIF) or small screen, such as a small television screen, then only the file 275 containing sufficient information for a small screen is sent to the client. If it is determined that the end-user viewing device is a full-sized TV screen, then the small screen file data 275 in addition to the extra elements needed for full screen resolution, i.e. file data 276, is sent to the client. Finally, if it is determined that the end-user viewing device is a high-definition display, then the small screen data 275 plus the full screen data 276 and the high definition data 277 is sent to the client device in such a way as the content is appropriately rendered and displayed according to the maximum resolution and play-back capabilities of the play-back device.

Figure 20:
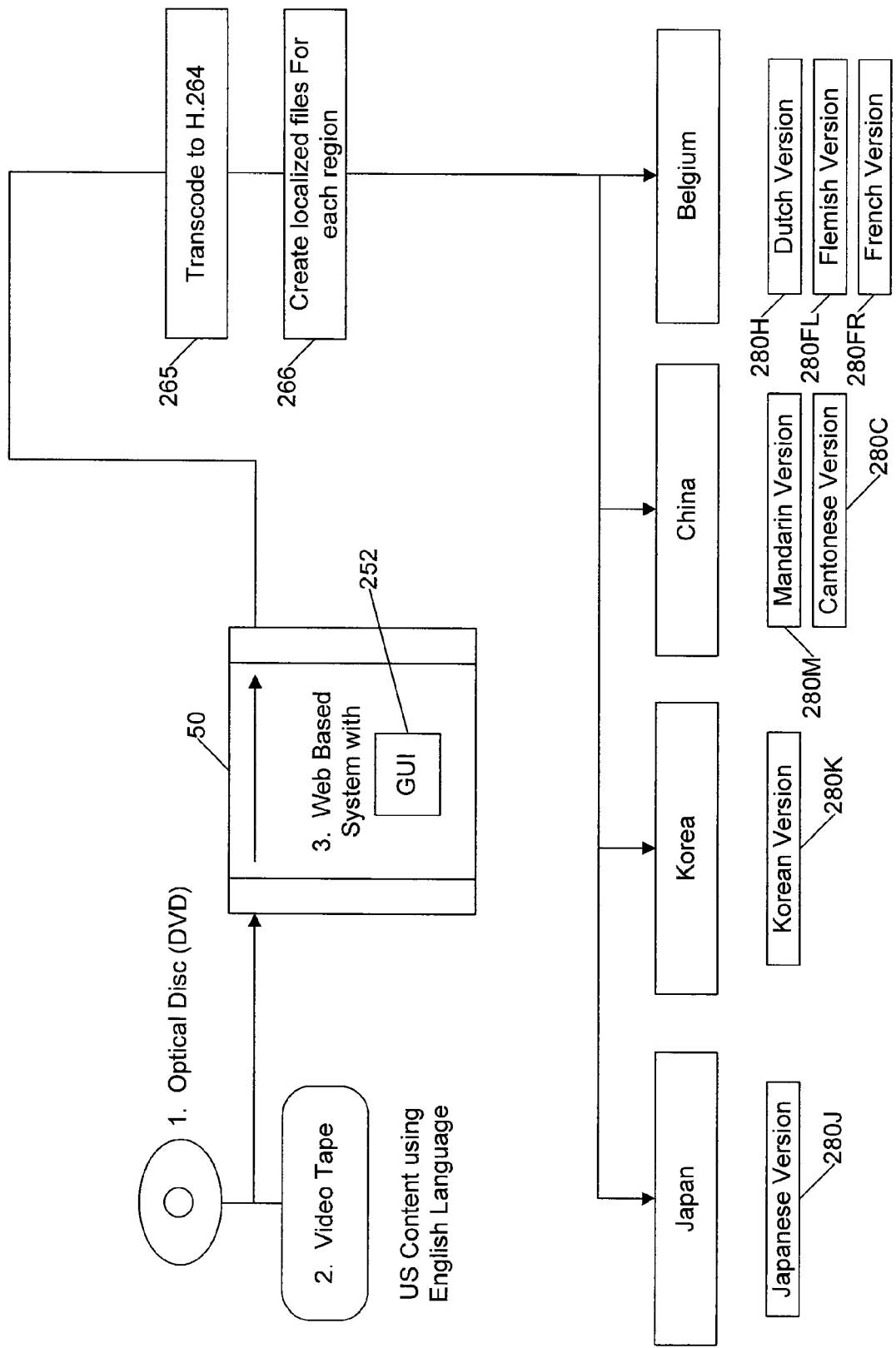
FIG. 20 illustrates an optional localization process which may be used in the content ingestion module of FIG. 18.

FIG. 20 is a more detailed illustration of one embodiment of a localization process (step 266 of FIG. 18) for the creation of localized files. This enables the system to handle localization issues. In addition, individual files can also be created at this stage to efficiently handle issues created by various play-back platforms and their unique encoding requirements (and specifications).

In one embodiment of the localization process, the source content may be subtitled for different regions. However, dubbing techniques may alternatively be used. No matter if the localization process adds subtitles or audio dubs, the result is the same. Discrete files are created for each version of the content so the multi-source network can stream (or download) the appropriate content with a minimum of processing power required on the service side. FIG. 20 illustrates an example in which discrete files are created at step 266 of FIG. 18, with subtitles or dubbing into various local languages. For example, a Japanese version 280J is created for Japan, a Korean version 280K is created for Korea, two versions (Mandarin 280M and Cantonese 280C) are created for China, and three versions are created for Belgium, specifically a Dutch version 280H, a Flemish version 280FL, and a French version 280FR. It can be seen that each localized version is contained in its own discrete file. After each localized file is created, more individual files are created from each localized file and these additional files are then transcoded to meet certain screen and other device specific criteria.

Other sets of discrete files for each source content file can be created for other purposes as well. The main reason to create individual discrete files for each received content file is either for localization purposes or device specific purposes, or both, although there may be other reasons for creating other types of individual discrete files.

Batch processes may be used to a large degree in order to create individual (discrete) files. Databases may be constructed that provide work-flow information for source content being ingested. These databases may determine the various processes which take place, and the appropriate batch programs may executed so all of the necessary files are created to satisfy the needs of the potential consumers.

Standard contracts may be provided for the content owners to fill-out and sign before uploading content, in order for them to have the protections they need. In addition, a contract may be provided for the service distribution providers to sign in order to protect their interest as well. In one embodiment, the multi-source distribution system includes one or more standard contract templates that can be filled-out and signed either electronically (by way of the E-Sign Act signed by President Bill Clinton), or signed manually. Such a contract (or contracts) may be designed to define the system's operation, the expectations, and the apportionment of all funds that are relevant to both the operators of the multi-source content distribution system and the content owner.

Content owners may wish to buy and sell other content properties that might be available at a given time. The multi-source content distribution system may include a mechanism and system for offers, acceptances, payments, and verifications for buying and selling multi-media content to take place over the multi-source system. Such a system may be accessed by means of a button on a screen visible to a user of the multi-source process, such as a content owner or content distribution provider. For example, in one embodiment, when a content owner finishes up-loading their last bit of content in addition to all of the component meta-data and ancillary materials, a button is displayed which may read as follows: "See other content files that are available to purchase"

The content owner "clicks" on this button and is presented with a list of content files that are legally available over the multi-source system "for sale". This content owner now becomes a potential "buyer". At this point, the potential "buyer" identifies a particular content file that is of high interest and plays it to verify it is correctly categorized and is otherwise, "as advertised". The potential "buyer" now places a "buy" offer through the multi-source system. Within a certain length of time, the offer is accepted and the ownership of the content changes once the appropriate amount of money has transferred from the "buyer" to the "seller".

In addition, futures, contracts, and other trading facilities (similar to commodities trading facilities) can be made available over the multi-source bridge distribution system as well. Some of the various transactions that can be made available are as follows:

The trading of options on content files
The buying of content files
The selling of content files
The trading of content files
The transferring of content files
The re-selling of content files
The trading of content file "futures"

Given the system as described in this application, it is possible to keep track of the content that is being ordered by the consumer so specific advertising methods can be used to encourage the purchase of goods and/or services. For example, if a consumer tends to watch NASCAR racing broadcasts and VOD sessions, the local car dealerships may want to invite such a consumer to a special event. This pinpoint advertising capability can become quite important to not only to the local community of business owners, but to national retailers as well.

In one embodiment, advertising may be incorporated in the multi-source content distribution system and method without disseminating a consumer's personal information. A serious problem that arises when trying to build a system that is capable of inserting "relevant" advertisements is the set of issues surrounding privacy and confidentiality. If consumer-level data is leaving the network and being made available to advertisers and others, consumers may protest at their loss of confidentiality, or governments (local, state, and federal) may step-in to reduce such practices.

At the same time, advertisers and others within the supply chain are not particularly interested in the identity of the consumer as much as they are interested to know their profile and a general geographic area that they live. Any information more granular than this is simply not necessary as the service operator could, in fact, notify the advertiser if there was a compelling reason to do so (and the consumer and the government entities were in approval of such a move).

Therefore, as long as profile information can be exchanged and other generalized data points can also be shared, then no other data is needed and the consumer's privacy and confidentiality can be protected to a large degree. Since such requirements (profile+general data) are all that are required, the multi-source system may use an "exchange" or proxy mechanism as illustrated in FIG. 20 to facilitate the passing of data to potential advertisers and network operators so "relevant" advertisements can be identified and inserted into content that is specifically targeted to certain consumers.

Figure 21:
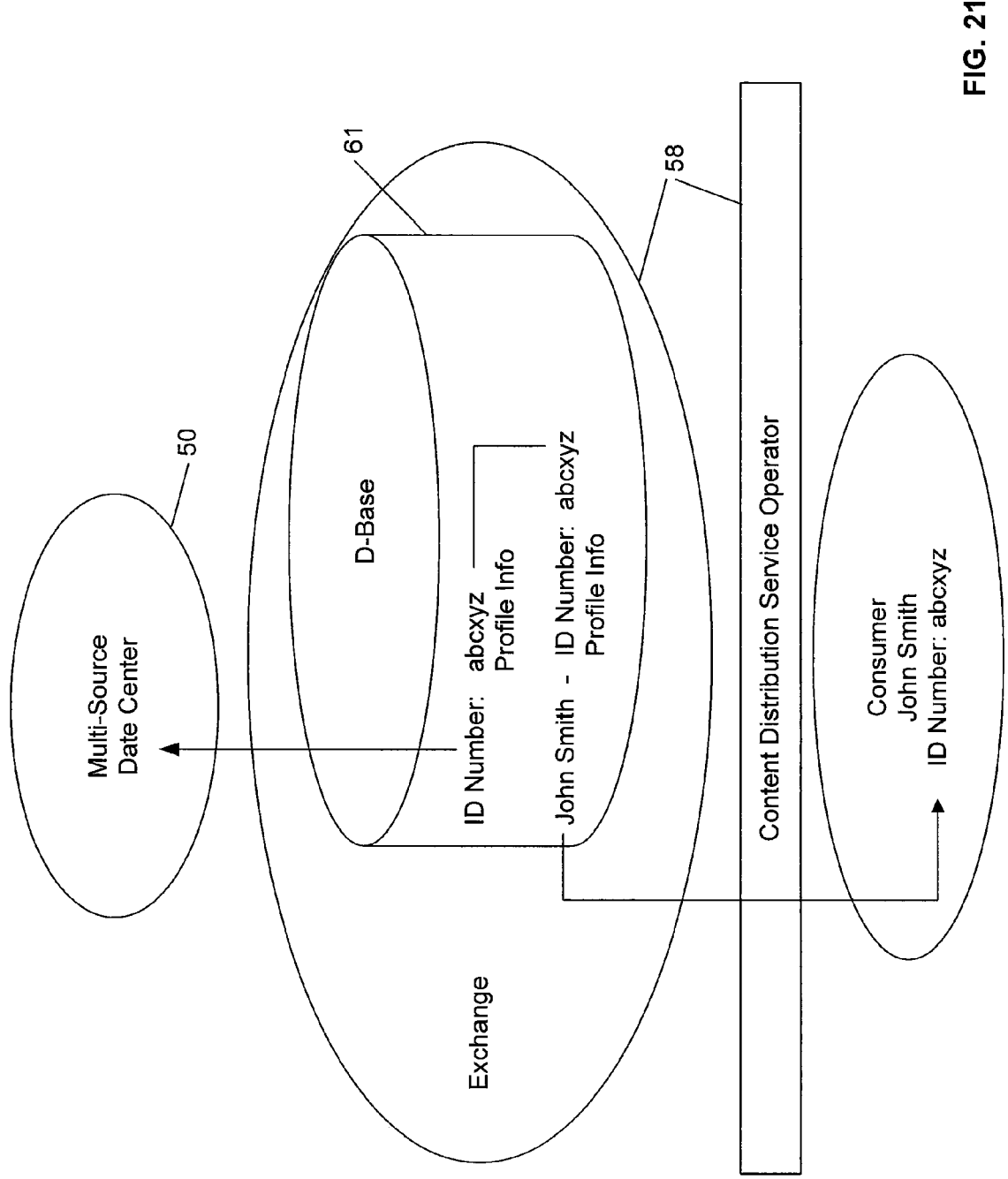
FIG. 21 is a functional block diagram illustrating an example of the proxy profile module of FIG. 17.

FIG. 21 illustrates an embodiment of the proxy module 358 of FIG. 17 for providing a consumer's profile information without exchanging consumer identifying or personal information. This module associates personal information which identifies each subscriber or consumer who subscribes to the content distribution service with a proxy comprising a unique identification code or the like, which may include numbers, letters, and/or symbols or the like. This information is stored in the data base 54 or 61, along with profile information such as the type of content requested by the consumer associated with the ID number. By simply exchanging a consumer's personal information for an ID Number, and then passing this ID Number with the profile data points to the multi-source data center 50 and then to users farther up the distribution chain, such as content owners or providers, "relevant" advertisements can be identified and then appropriately inserted into the content that is dedicated to that specific consumer. The illustrated proxy method allows consumer-level information to flow up to multi-source system operators and content owners/providers for the purposes of identifying "relevant" advertisements for insertion, without the threat of violating the consumer's privacy and/or confidentiality. Valuable coupons and/or promotional campaigns can be included with the advertisements (inserted into content streams or downloads) in order to further encourage the consumer to make a purchase. When purchases are made using a valuable coupon (or other mechanism used to track the ultimate success of an advertisement with a given consumer), empirical data can be supplied to the advertiser in order to assist in the process of identifying the effective vehicles for their advertisements.

FIG. 22 illustrates an embodiment of the proxy profile method in which the consumer orders a content "play" from his or her home, and then has a "relevant" advertisement inserted at a specific point within the distribution chain. In this scenario, the content owner or provider, a third party, the content distribution provider, or the multi-source distribution center has recognized characteristics of a particular consumer based on the profile information associated with the proxy or identification number for that consumer. They have also requested that one or more custom advertisements be inserted into the next content file ordered by that consumer. As illustrated on the left hand side of FIG. 22, a consumer 300 first orders content from the content distribution provider 58 to play on a device 62, such as a television. The requested content may have been originally obtained by a content owner 55 such as a motion picture studio, for example, and may be stored locally on the access network data base 61 or may be retrieved from the multi-source data base or from a peer access network data base, as discussed above in connection with FIGS. 2, 16A and 16B.

A custom advertisement 310 designed for that particular consumer is downloaded from the content owner (e.g. a motion picture studio), and inserted in the content file requested by the consumer. The content is then delivered to the consumer. This allows specific or relevant advertising to be provided to a consumer. Some of the ways that advertising can be inserted along with the content are as follows:

Advertising inserted by the content owner
Advertising inserted by the content distribution service provider
Advertising inserted by a third-party.

The issue is allowing the opportunity to insert "relevant" advertisements. As we all know from our years watching broadcast television, most advertisements are designed to promote brand awareness. They are not so much designed to encourage a consumer to make a buying decision on the spot. For these reasons and technology limitation reasons, "non-relevant", shot-gun style advertisements have been used for many years, with a high degree of success in creating brand awareness.

In the foregoing example, a "relevant" advertisement is a specific advertisement (previously produced and edited) which is inserted into multi-media content requested by a consumer because the consumer has demonstrated a history of having a specific profile that tends to desire the product being promoted. In other words, based on the things the consumer watches and does while he or she is enjoying interactive television, it becomes evident that the consumer falls into a certain category of buyer. Typical categories may include white collar—enjoys fast cars; homemaker—interested in children's content and health-related content; ethnic—enjoys content from the Middle East or other geographic area; and many more. Given information such as this list above and much more, profiles can be developed that help to identify the consumer being targeted for a "relevant" advertisement.

This directed advertising method takes advantage of the fact that many consumers enjoy watching advertisements that are relevant, and even enjoy purchasing items that were encouraged by relevant advertising. With this knowledge, it is easy to conclude that the following entities can benefit from relevant advertising models: Content owners; Network operators; Consumers; Advertisers; and Others in the distribution supply chain for goods and services.

In one embodiment, neural networks can be used within the multi-source content distribution system or network in order to gain new and improved perspectives on consumer habits while they are engaged in multi-source activities. Such artificially intelligent systems can store a great deal of relevant information and provide the following:

Potential content and web selections based on the consumer's own past history

Recommendations to advertisers as they attempt to locate the ideal advertisement to show the consumer based on the consumer's own past history and preferences.

Recommendations to producers of content regarding how they can best satisfy the demands of viewers within given networks.

The system as described in connection with FIGS. 21 and 22 identifies candidates for goods and services by way of a profile, and attaches appropriate advertisements to the content. In the same way, high-value coupons can be provided to the consumer in order to further encourage him (or her) to explore the product and service offerings from the advertisers. Ways to print coupons for such a service include (but are not limited to):

Emailing the coupon in a format that can be printed.
Electronic coupons (E-Coupons)
Adding a small printer to the television set or set-top-box
Printing the coupon at the retailer's site (for the consumer to pick-up when he/she arrives).

If the consumer decides to make a purchase (motivated by the pin-point advertising), then a bar code on the coupon can be scanned (by the retailer) and a database is updated further providing valuable information to the entities interested in the success rates of such pin-point advertising.

In the above system, coupons and other promotion-oriented incentives may be provided directly to the consumers. As advertisements are being inserted into the stream (or download) in the manner illustrated in FIG. 22, selected materials can be combined with the advertisements in such a way as to further convince the consumer to take assertive (positive) actions. Examples are as follows:

As an advertisement is sent to a consumer, a valuable coupon is emailed to the consumer's email address
As part of an advertisement, a number is displayed on the screen that can be easily copied by the consumer. This number can be used as a valuable coupon with an appropriate retailer.
Once an advertisement is sent to the consumer, a text message can be sent to a mobile device with the valuable coupon information within the text message.
Once an advertisement is sent to the consumer, some or all of the appropriate retailers can be made aware that the consumer is entitled to a certain discount.
The consumer can be prompted to press a button on the remote control unit to indicate the consumer's preference of coupons (including but not limited to the list above).
The consumer can press a button on the remote control requesting that the advertised item be immediately purchased including the discount that serves to lower the overall sale price. Other methods of providing valuable discount coupons and/or promotions to consumers may be coupled with the advertising stream or download.

By giving consumers the opportunity to make purchases based on valuable coupons (or promotional campaigns) coupled with the electronic delivery of advertisements, the buying loop can be closed and the advertiser can gain access to empirical data that can prove a certain advertisement yielded certain identifiable sales (to certain identifiable consumers).

This method can help advertisers to determine where best to place their advertising dollars. Although it is not possible for this method to determine if a consumer is paying attention to the advertisement, it is possible to monitor certain metrics that could suggest the successful viewing of a discrete advertisement. Metrics could be (but are not limited to):

1. The advertisement started successfully and not during a "rewind" or fast-forward" process
2. The advertisement played for (at least) 80% of its length before the consumer performed any operation whatsoever (i.e. change channel, request EPG, "rewind", "fast-forward", or otherwise).
3. Other metrics that could be used to determine if the advertisement played successfully.

Such empirical data can the be either sold back to advertisers or provided to them at no cost in order to encourage them to spend more of their advertising dollars on content delivered by systems such as Multi-Source.

This content integration system as described in this application may be associated with home gateway technologies which connect various consumer devices to access networks. Such home gateway technologies can also be used to move content from the main home to a vacation home, to move content to approved consumer electronic devices within a consumer's home network such as PCs and hand-held devices, and to move content to wireless devices.

In an alternative embodiment, the multi-source content distribution system described above may include a gateway or domain onto the open internet that effectively treats web pages in a similar fashion as the video content described above. In many places around the world, people do not have personal computers (PCs). In some cases, people simply do not have the money to purchase a PC. In other cases, people have leap-frogged PCs as they learn to be dependent on (and are completely satisfied with) smaller mobile devices. In such cases, a set-top-box (STB) within such a household may be used to surf the web within the context of a multi-source distribution or integration network. This assumes that no matter whether people have PCs or not, or they have mobile devices or not, they often have a TV set and, most likely, have a set-top-box. This set-top-box then can be used as a client to enjoy web pages within a domain that follows rules and policies specifically established for the population of set-top-boxes around the world. This system is equivalent to the embodiments illustrated above and as generally illustrated in FIG. 2, with the content providers 55 comprising web sites or Internet providers who provide content to client devices or content viewers such as set top boxes through the multi-source data center or distribution network illustrated in FIG. 2.

Some of the benefits of this approach are as follows. The preference engines allow governments, web providers/hosts, access networks, and consumers to manage their own preference engines that appropriately filter un-wanted content. Conversely, the proactive searching that takes place within the multi-source system can also identify potentially interesting web sites for the consumer. Web providers/hosts and access networks can enjoy a revenue-share by way of an appropriately designed network. The access network may want to promote the web site as such a web site becomes a business partner with the access network. Web sites may then be able to offer a much higher quality of service proposition as the access network can verify the content is handled appropriately and at the correct bit-rates. Web sites have the ability to leverage the "single integrated experience" as the consumer only needs one remote control in order to enjoy TV and navigate the web site. (The consumer does not need to jockey between the PC and the TV in order to participate in both experiences.) In addition, the consumer does not need to connect devices together in order to enjoy a fully integrated experience.

In this embodiment, a top-level domain such as .stb may first be established. This would be similar to ".com, .net, .tv, and others). By managing such a domain, an effort can be made to verify that all product developers adhere to an established set of rules and polices specifically defined for the domain. For example, it may be determined that all pages within the multi-source established domain are Java-based and a number of meta-tags (or other tags) exist that properly explain the contents that can be found within the web page. The meta-tags (or other tags) can be used to search or otherwise filter out the material contained on the web site. In one embodiment, all web pages used within such a system end with the domain suffix (such as .stb) in order for them to work properly within a set-top-box.

On the client-side, a library of code is programmed to properly operate and navigate through a fully operational multi-source implementation. The library of code (source code or executable code) is programmed to operate within the multi-source distribution system or network by way of multi-source-defined application programming interfaces (APIs). The domain web pages and the client-side code libraries can be designed to work together in order to present material from a public network (such as the internet) directly to a television viewer watching a standard television unit and operating a standard remote control.

Similar to the packet-based service for mobile phones known as I-Mode, offered by NTT DoCoMo in Japan, developers wishing to establish web pages within a multi-source domain ca be provided with development specifications, APIs and guidelines so that they can create web pages and associated content that can be offered to consumers over their TV set via the multi-source distribution network.

An alternative embodiment to establishing a new top-level domain is to create and maintain a registry of domain names at the multi-source distribution center that are designed to operate within the multi-source frame work. Though not as elegant as simply having a consistent extension (such as .stb), this alternative embodiment serves the same purpose. Developers can create customized web pages that work seamlessly for television access networks. Such a registry can be organized and governed by the sharing of specifications, standards, APIs, and common protocols. As long as these rules are followed appropriately, the middleware systems for television-based access networks can be configured to render the information in such a way as to appear seamless to consumers.

Either of the above approaches, either creating a new top-level domain such as .stb or creating a managed registry of URLs, produces an environment where developers around the world can enjoy the potential to capture the attention of millions (if not billions) of television viewers. Numerous "walled-garden" applications may be created using this technique.

A multi-source content distribution system as defined in this application may be designed to offer certain buttons on a remote control that work to reduce or eliminate a series of button presses. For example, a press of a button (or a click of a mouse-style device) can immediately purchase a specific item that is being advertised. A press of yet another button can record the playing of a content selection on a long-term storage device. Still another press of a button can bring up lists of available content. There are numerous such valuable one-click operations that can be implemented within the multi-source content distribution framework.

Although the multi-source bridge content distribution system and method as described above is concerned with content unit-cast streams and/or downloads, this system may also be used in conjunction with broadcast channels where the content provider is a broadcast network, for example. The multi-source system in this case can concatenate content sections and advertisements together and then broadcast (and/or multi-cast) these channels to all client devices that are equipped to capture these streams.

The multi-source system can be adapted to offer a content download model rather than a streaming model. Such a download model would require a storage mechanism (server-side or client-side) that would cache the content for the purposes of allowing the consumer to time-shift at his or her pleasure. This model allows consumers to make physical copies on media such as VCDs, DVD, tape, flash memory, or other storage media.

The multi-source content distribution system may provide content owners or providers with the option of listing their titles at the top (or near the top) of relevant pages, on payment of a fee. This option may be known as "pay-to-place". An example of "pay-to-place" is as follows: A consumer indicates that he or she wants to see the list of content selections where the key words entered are: billiards and US champions. As a function of the multi-source system, the content owner and advertiser "Brunswick" is allowed to list its own content select at the top of any list relevant to billiards for a pre-agreed fee. In this particular example, Brunswick has agreed to pay $1.00 to place its content selection at the top of the list for this query.

In one embodiment, the multi-source bridge content distribution network may also have the ability for consumers to register their electronics devices and associate these electronics devices with both the consumer's STB (or PC), and the consumer's account number. By navigating through the middleware system on their STB, or by accessing a designated web site using a PC, a consumer can create a unique ID for each electronics device. An example of such a unique ID for a consumer's electronics device may be as follows:

Device Type ID Number: XXX-001 (Apple iPod)
STB MAC Address: 123ABC
Customer Account Number: ROSSCOOPERACCOUNT
The concatenated ID for this particular consumer device for this consumer's account is: XXX-001123ABCROSSCOOPERACCOUNT If the consumer wishes to play content on an unregistered device or an unregistered STB (or PC), they simply update their account accordingly so the content plays without any problems. In this embodiment, if a device is unregistered, the multi-source network assumes either the device, the STB (or PC), or the consumer is not authorized to play the content. Other techniques may be used by the Multi-Source and the network to register devices in order for content to play appropriately.

A "Device Capabilities Profile" may be provided to subscribers of the multi-source network. Such a "Device Capabilities Profile" contains a list of devices and their capabilities. In one embodiment, content is provided to a given device when the device and its capabilities are supported both within the content owner's preference engine and also within the access network's preference engine. The system may revoke content to a particular device or class of devices as needed, or limit the type of content available depending on the device's security scheme. An example of a device capabilities profile is as follows:

MP4 player from Atheros, which supports Windows Media DRM, H.264, and native MPEG4. The screen format is 320× 240 QVGA, soundtrack is stereo, largest video file is less than 25 GB, connection is by USB or wireless, SD cards are supported, etc. This device may be assigned a device registry number of XXX-001.

The multi-source content distribution network in one embodiment is designed to allow the continuation of content from one device to another (finish watching content on the train—on mobile device) or finish watching on PC in the back bedroom. By leveraging the Device Registry (described above) and the Device Capabilities Profile (also described above), the multi-source system can determine when the consumer is switching from one consumer device to another and verify that the content parameters are correct for each new device coming on-line.

One example of content switching from one device to another is as follows. A consumer begins his or her day at home watching an instructional video about learning Spanish as a second language using the multi-source content distribution network. At this point, the multi-source content distribution network knows the consumer is directing the stream to a standard definition TV set and the content file streaming into the home is transcoded in such a way as to appear properly encoded for this TV set. After 30 minutes (or so), this consumer instructs the multi-source system to pause the stream and wait until new instructions are sent to the multi-source system. These instructions are received and acted on by the multi-source server at the access network level. The consumer then gets into a car and uses a mobile device to contact the multi-source system and send a request to resume Play. Once the multi-source system has validated the consumer device currently in use, it learns the encoding parameters are much different as the client device is now much smaller than a TV set and its encoding parameters are appropriately altered as to appear seamless to the consumer. At this point, the multi-source system can perform one of two different operations as follows:

1. Transcode the content files that are readily available in real-time in order for the encoding parameters to be correct
2. Select an appropriately encoded file from a directory of different encoded files for that same source content file.

Once the multi-source content distribution network has made a decision how best to resolve the encoding differences (real-time transcoding vs. selecting pre-encoded file), the content continues to be streamed to the consumer from the point where the consumer directed the content to Pause. (This point usually considered to be a "bookmark".) This allows consumers to trade devices while viewing content, switching the content play from one device to the next as desired.

Similar to the above description of an option to play content files from one client device in one location to another client device in another location, it is also possible for the multi-source system to be designed to allow the same seamless operation from one access network to another. An example of such an operation is as follows:

1. A consumer starts to watch an episode of the Sopranos on HBO on a first access network, such as the neighborhood cable system.
2. Half way into the episode, the consumer decides to "pause" the content stream and drive to the airport in order to take a plane flight to a location where the cable system is operated by a different company (second access network).
3. The multi-source network resolves the issues between the two access networks and allows the consumer to resume the play of the Sopranos at their destination, even though the consumer is in a distant geographical region.

The above described transitions between access networks and consumer devices are possible because the multi-source content distribution system is an independent network that is linked into the various access networks (or operated over the web). Since the multi-source content distribution system is an independent network, transitions over time, distance, and devices may be resolved relatively seamlessly.

In most content distribution platforms, the consumers are never clear about the Digital Rights Management (DRM) schemes that are in place or the rules and policies that govern the network. Therefore, it is common for consumers to ask questions such as, "Can I transfer to content to my PC?" Another question might be, "Can I record the content as it arrives on my play-back device so I can watch it later?" Questions like these and others are common and the correct answer to these questions is often difficult to find. The multi-source content distribution system may be designed to act as an agent to describe the various rights, rules and policies of an access network and any particular content selection. In this case, a consumer can press a designated button (on a remote control device or other similar device) in order to receive a clear explanation of all "Rights", policies, and rules that have been established for the play-back of the particular content selection in question.

Another option for a multi-source content distribution system or network is to operate a service similar to the Nielsen Ratings Service that places devices into consumer's homes for the purpose of capturing television viewing habits. The multi-source network may capture and store empirical data for the purpose of reporting actual viewing habits for the content that is distributed by the multi-source network. Such "Nielsen-style" ratings services can also be expanded if the multi-source network becomes the network selected to deliver premium content in addition to the more obscure content selections.

The multi-source content distribution system or network can also be used to provide platforms for interactive gaming and the administration and delivery of valuable rewards. Interactive games may be stored at the multi-source distribution center 50 or at the multi-source content distribution provider on the access network level. On request for a particular game, the multi-source distribution system may deliver segments of the game in a way that is similar to the delivery of content using trick-play features. In doing so, consumers can enjoy audio and video sequences that they need to see in order to make important decisions regarding how best to navigate through the game.

There are several other possible options that could be provided in conjunction with the multi-source content distribution system or network as described above. For example, consumer rewards may be built into the system. When it is determine that a reward of some type is to be delivered to a specific consumer, the Multi-Source network can identify the correct consumer and deliver the reward in a number of ways, for example:

Valuable coupons can be delivered electronically or by a postal service

Discounts on utility bills (such as the bill for Pay-TV service) can be provided Extra movie or game "plays" can be provided Extra broadcast channels can be provided for a designated period of time.

Other types of rewards and reward delivery methods can also be used.

The multi-source content distribution network may also be adapted to allow mixing of video streaming and blogging, for example, to create "viewers forums" around live events, or to create real-time polling/talk-back chat rooms centered around a live news commentary or sports event. "Virtual" betting and side-games may be provided around a live sports event, with contests and prizes. Other options which may be provided include:

"Pick your movie end" where movies are streamed with viewers choosing the end;

Advertising-based contests ("Find the six green Volkswagen bugs in this movie") that leverage product placements within a video program;

Letting users create highlights of a particular video moment, to share with their friends and family;

Editing and remixing portions of branded video segments. (A similar feature is currently being trialed by the British Broadcasting Corporation or BBC)

The multi-source bridge content distribution system as described above is fundamentally the collaboration of content owners/providers in partnership with access network operators or content distribution providers leasing space on access networks, so as to provide consumers with many more viewing choices in a readily accessible manner.

The multi-source bridge content distribution system described in the above embodiments links various external content sources to local access networks. This provides the content sources with numerous new channels of distribution and potential revenue. The access networks or content distribution providers using the local access network to distribute content do not need to compete directly with the large web portals during a time when the competition may be extreme. The consumer can enjoy an integrated system that can also provide time-shifting and location-shifting technologies and solutions in certain embodiments.

Such a design allows content to be managed effectively when it does not flow naturally from one geographical region to another for numerous reasons including (but not limited to):

Relevance for the region

Humor may be fundamentally different within discrete geographical regions

Basic preference may be different within discrete geographical regions

Competing content offerings may influence the attractiveness of certain multi-source content offerings Those of skill will appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method of distributing content from a plurality of different content providers to subscriber devices, comprising:

receiving and storing content files from a plurality of different content providers at a multi-source data center, including storing associated data for each content file, the associated data comprising file content meta-data and content preference settings associated with the content provider of each content file at the multi-source data center;

connecting the multi-source data center to a plurality of multi-source content distribution providers over a multi-source distribution network, each multi-source content distribution provider associated with a selected group of subscriber devices for connection with the subscriber devices over at least one second network;

connecting at least one multi-source content distribution provider to a selected subscriber device in the associated group over the second network;

receiving a request for at least one content file from the subscriber device;

when the request for the content file is received from the subscriber device, comparing the content preference settings of the content provider of the requested content file with the distribution preference settings of the local content distribution provider and comparing the subscriber preference settings of the requesting subscriber device with the content meta-data of the requested file; and providing the content of at least one requested content file from the multi-source data center to the selected subscriber device through the content distribution provider associated with the subscriber device only if a predetermined match is found between the content preference settings and distribution preference settings, and between the content meta-data and subscriber preference settings.

2. The method of claim 1, wherein at least some of the content distribution providers are associated with second networks comprising respective client access networks and provide content to subscriber devices over the client access networks.

3. The method of claim 1, wherein the client access networks are selected from the group consisting of cable networks, Internet protocol television (IPTV) networks, telephone company networks, and satellite networks.

4. The method of claim 1, wherein at least one second network comprises a public network and at least some of the content distribution providers are associated with web portals to provide content to subscribers over the public network through the web portals.

5. The method of claim 1, wherein at least one second network comprises a mobile network and at least some of the content distribution providers are associated with mobile networks to provide content over a mobile network to mobile device users.

6. The method of claim 1, wherein at least some of the content distribution providers are application service providers and provide content to subscriber devices through the internet.

7. The method of claim 1, wherein the content and distribution preference settings include title-level criteria based on the content of a requested content file, and the step of comparing the preference settings includes comparing content meta-data of a requested content file with the title-level criteria in the distribution preference settings, whereby a particular content file is only provided to the local content distribution provider if there is a match between the content meta-data and the title-level criteria.

8. The method of claim 1, wherein at least some of the preference settings are selected from the group consisting of geography, content ratings, pricing, parental controls, digital rights management (DRM), and localization.

9. The method of claim 1, further comprising coordinating the billing systems of the content provider and the content distribution provider at a multi-source billing coordination module at the multi-source data center when a content file of the content source is requested by a subscriber of the content distribution provider, whereby a total amount billed to a requesting subscriber is shared between the content provider billing system and the distribution provider billing system.

10. The method of claim 1, further comprising creating an extended program guide (EPG) of the content files available from each multi-source content distribution provider, and providing the respective content distribution provider EPG to the group of subscribers associated with the respective content distribution provider.

11. The method of claim 1, further comprising receiving a request for subject matter from a subscriber, searching meta-data associated with saved content files to look for the requested subject matter in the meta-data, and providing the subscriber with a list of content file titles having meta-data corresponding to the requested subject matter.

12. The method of claim 11, further comprising allowing a subscriber to select a title from the list and providing the content of the file associated with the selected title to the subscriber.

13. The method of claim 11, further comprising repeating the step of searching for the respected subject matter in meta-data associated with saved content files at predetermined intervals and providing the search results to the requesting subscriber after each search.

14. The method of claim 1, wherein the content is provided to the subscriber as a video-on-demand session.

15. The method of claim 1, wherein the content is provided to the subscriber as a broadcast session.

16. The method of claim 1, further comprising collecting content file request history for each requesting subscriber, creating a subscriber profile based on the file request history, and inserting custom advertisements in content files provided to the subscriber based on the profile created for that subscriber.

17. The method of claim 16, further comprising providing coupons to subscribers based on the profile created for each respective subscriber.

18. The method of claim 1, further comprising;
collecting content file request history for each requesting subscriber;
creating a subscriber profile based on the file request history;
associating each subscriber with an identification code which does not include any subscriber personal information, associating the profile of each subscriber with the subscriber identification code, and providing the profile and associated subscriber identification code only to prospective advertisers outside the multi-source network, whereby subscriber personal identification information is not provided outside the multi-source content distribution network; and
inserting custom advertisements in content files provided to the subscriber based on the profile created for that subscriber.

19. The method of claim 1, further comprising receiving a request at the multi-source data center from at least one content distribution provider for download of selected titles, uploading the selected titles from the multi-source data center to the requesting content distribution provider, and storing the received titles in a local multi-source data storage module at the content distribution provider.

20. The method of claim 19, wherein the step of providing a selected content file to a subscriber device comprises checking whether the requested content file is available in the local data storage module of the content distribution provider of the requesting subscriber, searching for the content file at the multi-source data center if not available at the local data storage module, and providing the requested content file to the subscriber.

21. The method of claim 20, wherein the step of searching for the content file at the multi-source data center comprises searching for the content file in a plurality of different locations, wherein the locations comprise data storage modules at the multi-source data center and local data storage modules of peer content distribution providers, and the step of providing the requested content file comprises providing the content from a selected one of the locations containing the content file.

22. The method of claim 21, further comprising storing the start portions only of a selected set of content files at the local data storage module of at least one content distribution provider, providing the start portion of a requested content file in the selected set to a subscriber on request, requesting the remainder of the content file from the multi-source data center as the start portion is playing, and providing the remainder of the content file to the subscriber on receipt from the multi-source data center.

23. The method of claim 1, further comprising:
storing the distribution preference settings associated with each content distribution provider;
storing the subscriber preference settings associated with each subscriber in the groups associated with the content distribution providers;
storing government preference settings which apply to subscribers belonging to respective institutional bodies independent from the content provider and distribution providers;
after receiving the request for at least one content file at the multi-source data center, comparing the content meta-data of the requested file and the government preference settings of the respective institutional body to which the requesting subscriber belongs, in addition to comparing the subscriber preference settings with the content meta-data and comparing the content preference settings of the content provider and the distribution preference settings of the local content distribution provider; and
providing a requested content file to a requesting subscriber only when there is a sufficient match between the content preference settings and the distribution preference settings, between the content meta-data and the government preference settings applying to an institutional body to which the requesting subscriber belongs, and between the subscriber preference settings and the content meta-data.

24. The method of claim 23, further comprising establishing different government preference settings corresponding to different institutional bodies to which different multi-source system subscribers belong, at least some of the institutional bodies being selected from the group consisting of countries, states, and other geographical regions.

25. The method of claim 1, wherein the file content meta-data includes content ratings.

26. The method of claim 25, wherein at least some of the content ratings are established by the multi-source data center.

27. The method of claim 1, wherein the associated data further comprises trailers and promotional material.

28. The method of claim 1, wherein the associated data further comprises digital rights management (DRM) requirements.

29. The method of claim 1, further comprising creating multiple associated files at the multi-source data center for each received content file and storing the original content file and associated content files.

30. The method of claim 1, further comprising adding invisible watermarks to each received content file at the multi-source data center prior to creating associated files for each received content file adapted for different subscriber devices and including the invisible watermarks, and storing the received content file and associated files.

31. The method of claim 1, further comprising providing content sources with an option to buy, trade, or sell content files stored at the multisource data center.

32. A multi-source bridge content distribution system, comprising:
a plurality of multi-source content distribution providers each associated with a different group of subscribers for providing content to subscriber devices, each content distribution provider having a network for distributing content to the subscriber devices of the respective subscriber group, each multi-source content distribution provider having a distribution preference module containing distribution preference settings established by the multi-source content distribution provider;
a multi-source data center having a first communication module configured to communicate with a plurality of content providers, a data storage module associated with the first communication module for receiving and storing content files from the content providers, a second communication module configured to provide requested content files to the content distribution providers, and a control module configured to process content files for storage in the data storage module and to operate the communication modules to receive and distribute content files, the control module being configured to associate each content file stored in the data storage module with content preference settings of the content source including file content meta-data;
a multi-source network linking the multi-source data center to the multi-source content distribution providers, whereby content from a plurality of different content providers can be provided from the multi-source data center to any subscriber device through the associated multi-source content distribution provider and network; and
a preference control module configured to receive subscriber preference settings of a subscriber requesting a content file, and when a content file request is received, to compare the content preference settings of the content source of the requested content file with the distribution preference settings of the local content distribution provider of the requesting subscriber and to compare the subscriber preference settings of the requesting subscriber with the file content meta-data, and to control the second communication module to provide the content of a selected content file from the multi-source data center to a requesting subscriber through the local content distribution provider of the requesting subscriber only if a predetermined match is found between the content preference settings and the distribution preference settings and between the subscriber preference settings and the meta-data of the selected content file.

33. The system of claim 32, further comprising a multi-source billing coordination module configured to link content provider billing systems and content distribution provider billing systems, whereby billing associated with providing a requested content file to a subscriber is shared between the provider of the content file and the distributor of the content file.

34. The system of claim 32, wherein at least some of the multi-source content distribution provider networks are client access networks.

35. The system of claim 34, wherein the client access networks are selected from the group consisting of cable networks, Internet protocol television (IPTV) networks, telephone company networks, and satellite networks.

36. The system of claim 32, wherein at least some of the multi-source content distribution providers are Internet service providers (ISPs) configured to provide content to subscribers through web portals.

37. The system of claim 32, wherein at least some of the content distribution providers are configured to provide content to subscribers using mobile devices over mobile networks.

38. The system of claim 32, further comprising a government preference module for containing preference settings established by a government organization independent from the content distribution system for content of files to be provided to subscribers falling under the rules of the government organization, the preference control module being further configured to compare the government preference settings with the file content meta-data and to control the second communication module to provide the content of a selected content file to a subscriber only if a match is found between the file content meta-data and the government preference settings.

39. The system of claim 32, further comprising a content source billing system associated with each content source and a multi-source distribution billing system associated with each multi-source distribution provider, the control module at the multi-source data center including a billing module configured to coordinate the billing systems of the content source and the content distribution provider when a content file of the content source is requested by a subscriber of the content distribution provider through the multi-source data center and local access network, whereby a total amount billed for a requested content file is shared between the billing systems.

40. The system of claim 32, wherein each multi-source content distribution provider has a multi-source data base containing selected complete and partial content files downloaded from the multi-source data center.

41. The system of claim 32, wherein each multi-source content distribution provider has a multi-source data base and a multi-source control module associated with the data base configured to control supply of content to its subscriber group, the multi-source distribution provider data base having an extended program guide (EPG) of the content files available from the multi-source content distribution provider, and the multi-source distribution provider control module being configured to provide the EPG to the group of subscribers associated with the respective content distribution provider.

42. The system of claim 32, wherein the multi-source data center further comprises a search engine configured to search meta-data associated with each content file in response to a subscriber request for desired content, and to provide a list of content files containing the desired content to the subscriber through the multi-source content distribution provider.

43. The system of claim 32, wherein at least one of the multi-source data center and content distribution provider has a subscriber profile module configured to collect content file request history for each requesting subscriber, to create a subscriber profile based on the file request history, to provide subscriber profiles to prospective advertisers outside the multi-source system, and to insert custom advertisements in content files provided to the subscriber based on the profile created for that subscriber.

44. The system of claim 43, wherein the subscriber profile module is further configured to associate each subscriber with an identification code which includes no subscriber personal identifying information, to associate the subscriber profile of each subscriber with the subscriber identification code, and to provide the associated subscriber identification code and corresponding subscriber profile without any subscriber personal identifying information to prospective advertisers outside the multi-source network, whereby subscriber personal identification information is not provided outside the multi-source content distribution network.

45. The system of claim 32, wherein the multi-source network includes peer-to-peer links between multi-source content distribution providers for peer-to-peer content sharing, each multi-source content distribution provider having a local data base containing selected content files downloaded from the multi-source data center, each multi-source content distribution provider having a control module configured to search for content requested by a subscriber in its own local data base, to request the content from peer content distribution providers or from the multi-source data center if not available in its own local data base, and to download the content to provide to the requesting subscriber from other local data bases or the multi-source data center data base if not available at its own local data base.

46. The system of claim 32, wherein each multi-source content distribution provider has a control module configured to provide a start portion of a selected content file to a subscriber on request, to request the remainder of the content file from the multi-source data center as the start portion is playing, and to provide the remainder of the content file to the subscriber on receipt from the multi-source data center.

47. The system of claim 32, wherein the multi-source data center further comprises a content ingestion module configured to create multiple associated files corresponding to each received content file, and to index and store the original content file and the associated files in the data base.

48. The system of claim 47, wherein the associated files further comprise files localized for a plurality of different geographical regions.

49. The system of claim 32, wherein the associated files comprise files having different digital rights management (DRM) properties adapted for both a plurality of different subscriber device DRM requirements and a plurality of different subscriber device screen sizes.

50. The system of claim 32, wherein the file ingestion module is configured to add invisible watermarks to each received content file at the multi-source data center prior to creating the multiple associated files containing the invisible watermarks and storing the files.

51. The system of claim 32, wherein the first communication module is configured to communicate with content sources comprising selected web sites over the internet and the control module is configured to link content from the selected web sites to requesting subscribers through the multi-source network.

* * * * *